United States Patent
Yu et al.

(10) Patent No.: US 12,411,465 B1
(45) Date of Patent: Sep. 9, 2025

(54) METHODS, APPLICATIONS, AND DEVICES FOR DETERMINING OPTIMAL CONTROL FORCES OF BUILDING STRUCTURES

(71) Applicant: HEFEI UNIVERSITY OF TECHNOLOGY, Anhui (CN)

(72) Inventors: Tianhao Yu, Hefei (CN); Jingfeng Wang, Hefei (CN); Lei Guo, Hefei (CN); Zhuo Gao, Changchun (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 19/031,915

(22) Filed: Jan. 18, 2025

(30) Foreign Application Priority Data

Jul. 29, 2024 (CN) .......................... 202411018385.4

(51) Int. Cl.
G05B 13/04 (2006.01)
G05B 13/02 (2006.01)

(52) U.S. Cl.
CPC ......... G05B 13/048 (2013.01); G05B 13/027 (2013.01)

(58) Field of Classification Search
CPC ............................ G05B 13/048; G05B 13/027
See application file for complete search history.

(56) References Cited

U.S. PATENT DOCUMENTS

| | | | |
|---|---|---|---|
| 2002/0042667 A1* | 4/2002 | Momoi | G01M 7/06 700/280 |
| 2002/0099475 A1* | 7/2002 | Spangler | G05B 19/19 700/60 |

(Continued)

FOREIGN PATENT DOCUMENTS

| | | |
|---|---|---|
| CN | 101581942 A | 11/2009 |
| CN | 102866631 A | 1/2013 |

(Continued)

OTHER PUBLICATIONS

Yu, Tianhao et al., Modeling and Model Updating of a Full-Scale Experimental Base-Isolated Building, Engineering Structures, 2023, 67 pages.

(Continued)

*Primary Examiner* — Christopher E. Everett
(74) *Attorney, Agent, or Firm* — PORUS IP LLC

(57) ABSTRACT

A method, an application, and a device for determining an optimal control force of a building structure are provided. The method includes constructing a vibration control equation of the building structure based on an external excitation and a controller network for the building structure; constructing a target function and a constraint condition of the controller network at a current moment based on the vibration control equation for the building structure; transforming the target function and the constraint condition of the controller network at the current moment into a mixed integer optimization problem using a segmented McCormick inequality; predicting integer variable values in the mixed integer optimization problem at the current moment using a trained prediction module; and obtaining an optimal control force of the controller network at the current moment by solving the mixed integer optimization problem at the current moment based on the predicted integer variable values.

11 Claims, 16 Drawing Sheets

(56) References Cited

U.S. PATENT DOCUMENTS

| | | | | |
|---|---|---|---|---|
| 2010/0131114 | A1* | 5/2010 | Stothers | F16F 7/1011 |
| | | | | 188/379 |
| 2013/0085617 | A1* | 4/2013 | Ladra | B66C 13/066 |
| | | | | 700/280 |
| 2023/0038838 | A1* | 2/2023 | Raghunathan | G05B 13/048 |
| 2024/0012366 | A1* | 1/2024 | Raghunathan | G05B 6/02 |

FOREIGN PATENT DOCUMENTS

| | | |
|---|---|---|
| CN | 118052380 A | 5/2024 |
| WO | 2024007476 A1 | 1/2024 |

OTHER PUBLICATIONS

Kalman R. E., A New Approach to Linear Filtering and Prediction Problems, Journal of Basic Engineering, 1960, 12 pages.

Mei Gang et al., Model Predictive Control of Structures under Earthquakes using Acceleration Feedback, Journal of Engineering Mechanics, 2002, 12 pages.

Scruggs J. T. et al., Non-linear stochastic controllers for semiactive and regenerative systems with guaranteed quadratic performance bounds—Part 1: State feedback control, Structural Control and Health Monitoring, 2007, 20 pages.

Dyke S. J. et al., Seismic Response Reduction Using Magnetorheological Dampers, IFAC Proceedings Volumes, 29(1):5530-5535, 1996.

Notification to Grant Patent Right for Invention in Chinese Application No. 202411018385.4 mailed on Sep. 4, 2024, 5 pages.

Lin, Xiufang et al., Vibration Control of A Seismically-Excited Structural Building with MR Dampers Based on ICA-LQG, Journal of Vibration and Shock, 37(5): 194-201, 2018.

Yu, Tianhao et al., Real-time Neural Network Based Semiactive Model Predictive Control of Structural Vibrations, Computers & Structures, 2023, 47 pages.

* cited by examiner

800

In response to receiving a prediction start signal from a sensing module, determine a probability distribution of spectrum characteristics of a predicted external excitation at a future moment according to spectrum characteristics of a historical external excitation and environmental data at a plurality of historical moments — 810

Based on the probability distribution of the spectrum characteristics the predicted external excitation, determining a predicted control force matrix at the future moment — 820

In response to a first difference satisfying a first preset condition, performing a pre control based on a predictive control force matrix — 830

FIG. 8

METHODS, APPLICATIONS, AND DEVICES FOR DETERMINING OPTIMAL CONTROL FORCES OF BUILDING STRUCTURES

CROSS-REFERENCE TO RELATED APPLICATIONS

This application claims priority to Chinese patent application No. 202411018385.4, filed on Jul. 29, 2024, the entire contents of which are incorporated herein by reference.

TECHNICAL FIELD

The present disclosure belongs to the technical field of vibration control of a building structure, and in particular relates to a method, an application, and a device for determining an optimal control force of a building structure.

BACKGROUND

With the continuous progress of science and technology, the ability of human beings to resist all kinds of natural disasters is constantly improving. Traditional building strength design methods prevent damage to the building structure by enhancing the building's own resistance to ensure the overall stability of the building under the external excitation (e.g., strong winds, earthquakes, etc.).

Because of the poor economy of the traditional methods, in recent years, the building structure vibration control technology has become a research hotspot in the field of construction. The building structure vibration control technology changes the dynamics performance or damping dissipation performance of the building structure system by adopting the theory and method of the building structure vibration control, in order to increase and improve the vibration resistance of the building structure, and avoid the plastic deformation of the building structure.

At present, the commonly used control methods in the vibration control technology of the building structure are mainly categorized into three types: active control, semi-active control, and passive control. Passive control is the control without applied energy, by attaching controllers to the appropriate parts of the building structure to dissipate the mechanical energy generated by the building structure due to vibration deformation. While passive control does not require external energy, is simple in construction, has a low cost, and is easy to maintain, it has a limited effect on the vibration control of the building structure, and the degree of flexibility in the control process is poor.

Active control is the control of an external energy source. Although active control has high flexibility and good effects in the control process, the controller requires a large amount of electrical energy to directly provide the control force and inject energy into the building structure, resulting in extremely high costs. Moreover, in harsh environments, power outages or sensor failures prevent the controller from injecting the corresponding energy into the building structure, ultimately leading to structural instability.

The advantage of semi-active control is that it does not require a large amount of external energy input to directly provide the control force. Semi-active control uses a small amount of external energy supply for the controller's modulation to allow it to actively utilize the reciprocal relative deformations or velocities of the building structure in vibration to achieve active optimal control force. Because semi-active control ensures that no energy is injected into the building structure from the hardware level, there is no chance of a sensor failure injecting too much energy into the building structure, which could lead to destabilization of the building structure. Additionally, semi-active control is significantly better than passive control.

However, the existing semi-active control based vibration control methods for the building structure cannot meet the requirements of real-time vibration control in terms of computational efficiency; The control force is not the optimal problem, that is, under the framework of semi-active control without injecting energy into the building structure, there is still room for improvement in the control effect.

SUMMARY

In order to overcome the deficiencies of the prior art described above, one or more embodiments of the present disclosure provide a method for determining an optimal control force of a building structure, which is capable of efficiently solving for an optimal control force of a controller network in a building structure at a current moment.

To achieve the above purposes, one or more embodiments of the present disclosure employ the following technical solutions.

A method for determining an optimal control force of a building structure, includes:
- S1, constructing a vibration control equation of the building structure based on an external excitation and a controller network for the building structure;
- S2, constructing a target function and a constraint condition of the controller network at a current moment based on the vibration control equation for the building structure;
- S3, transforming the target function and the constraint condition of the controller network at the current moment into a mixed integer optimization problem using a segmented McCormick inequality;
- S4, predicting integer variable values in the mixed integer optimization problem at the current moment using a trained prediction module; and
- S5, obtaining an optimal control force of the controller network at the current moment by solving the mixed integer optimization problem at the current moment based on the predicted integer variable values.

One or more embodiments of the present disclosure further provide a method for vibration control of a building structure, includes:
- step 1, employing the method for determining an optimal control force of a building structure of the one described above, obtaining the optimal control force of the controller network of the building structure at the current moment, and determining a control force of a corresponding controller at the current moment, the controller network including a plurality of dampers within the building structure;
- Step 2, calculating, based on the control force of each controller at the current moment and arrangement of a damper of a floor corresponding to each controller, a control force of the damper at the current moment;
- Step 3, adjusting a damping coefficient of the damper according to the control force of the damper at the current moment, and performing a vibration control on the building structure; and
- repeating the Step 1 to the Step 3 to perform a continuous vibration control on the building structure.

In some embodiments, in Step 3, a processor also adjust the damping coefficient of the corresponding damper based on the control force of the damper at the current moment and the optimal control force of the controller network at the current moment to perform the vibration control on the building structure.

One or more embodiments of the present disclosure further provide a system for vibration control of a building structure including: sensors, damper, a processing module, and a prediction module, wherein the sensors and the dampers are arranged within the building structure, all of the dampers within the building structure constitute a controller network in the building structure, and the processing module is configured to receive state data of the building structure collected by the sensors, obtain a mixed integer optimization problem of the controller network in the building structure after computation and processing based on floor acceleration data collected by the sensors, and feed the mixed integer optimization problem into the prediction module, the prediction module is configured to predict an integer variable value in the mixed integer optimization problem and feed the integer variable value back to the processing module, the processing module is configured to obtain an optimal control force of the controller network in the building structure at the current moment by calculating based on the integer variable value fed back from the prediction module, and perform a vibration control on the building structure by adjusting a damping coefficient of a corresponding damper based on the optimal control force at the current moment; and each of the modules, the sensors, the dampers are programmed or configured to perform the method for vibration control of a building structure.

One or more embodiments of the present disclosure further provide a computer-readable storage medium, the computer-readable storage medium storing a computer program programmed or configured to perform the method for vibration control of a building structure described above.

One or more embodiments of the present disclosure further provide a computer program product including a computer program/instruction that, when executed by a processor, implements the steps of the method for vibration control of a building structure as described above.

One or more embodiments of the present disclosure further provide a method for selecting and arranging a damper in a building structure, including:

Step 01, determining a damper arrangement scheme, wherein the damper arrangement scheme including selection of a damper type and determination of an arrangement position;

Step 02, simulating different external excitations based on the damper arrangement scheme in the building structure at a current moment, and adopting the method for determining an optimal control force of a building structure to obtain the optimal control force of the controller network in the building structure at the current moment under the different external excitations; and Step 03, if the current damper arrangement scheme fails to satisfy an optimal control force requirement of the controller network in the building structure at the current moment under the different external excitations, adjusting the damper arrangement scheme and going back to the step 02 until the current damper arrangement scheme meets the optimal control force requirement of the controller network in the building structure at the current moment under the different external excitations, then designating the current damper arrangement scheme as a final arrangement scheme of the dampers in the building structure.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 8 is an exemplary flowchart for determining a predictive control force matrix according to some embodiments of the present disclosure;

DETAILED DESCRIPTION

In order to make the technical solutions of one or more embodiments of the present disclosure clearer and more explicit, the following description of one or more embodiments of the present disclosure is given clearly and completely in conjunction with the accompanying drawings. Without creative labor, persons of ordinary skill in the field of the present disclosure perform equivalent replacements and conventional reasoning on the technical features of the technical solutions of one or more embodiments of the present disclosure that fall into the protection scope of the one or more embodiments of the present disclosure.

Embodiment 1

Figure 1:
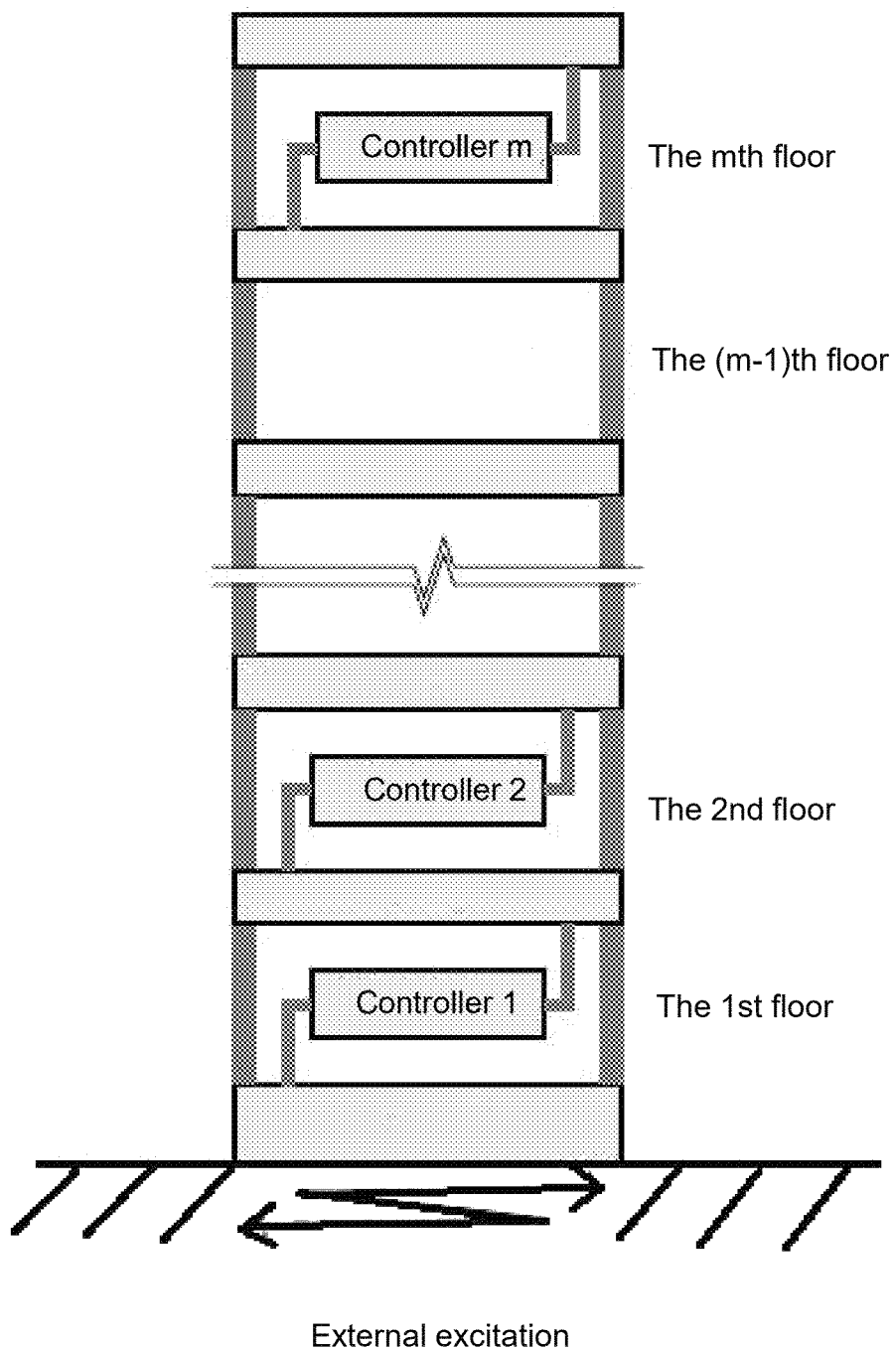
FIG. 1 is a schematic diagram of a building structure arranged with controllers according to some embodiments of the present disclosure.

FIG. 1 is a schematic diagram of a building structure arranged with controllers according to some embodiments of the present disclosure. The building structure in FIG. 1 includes m floors, wherein any n floors are provided with dampers, m≥n≥1, and m, n are positive integers; and sensors are arranged on each floor of the current building structure. The computational technology of abstracting all dampers at one floor into a controller based on the arrangement of the dampers is prior art (Yu T, Johnson E A, Brewick P T, et al. Modeling and model updating of a full-scale experimental base-isolated building [J]. Engineering Structures, 2023, 280:114216-. DOI: 10.1016/j.engstruct.2022.114216.), and will not be repeated here. The controller at the first floor of the building structure is noted as the controller 1, and the controller at the mth floor of the building structure is noted as the controller m. All of controllers in the building structure constitute the controller network for the current building structure. Sensors used to collect the acceleration of the building structure are set on each floor of the building structure, but are not drawn in FIG. 1.

Dampers are not mandatory on each floor of the building structure, so there is not a corresponding controller on each floor of the current building structure. One end of the controller is connected to a shed roof of the corresponding floor, and the other end is connected to a base plate of the corresponding floor. In some embodiments of the present disclosure, different dampers be used in a building structure.

According to the acceleration (i.e., the floor acceleration) of each floor in the building structure collected by the sensors, that is, the relative acceleration between the shed roof and the base plate, based on the Kalman filtering manner (Kalman R E. A New Approach To Linear Filtering and Prediction Problems [J]. Journal of Basic Engineering, 1960, 82:35-45. DOI: 10.1115/1.3662552.), a state vector of the building structure may be inverted. The state vector of the building structure refers to a velocity and a displacement of floor vibration in the building structure. That is, the state vector of the building structure is obtained as prior art, which is not repeated here.

The type of the external excitation in FIG. 1 is earthquake that is input into the current building structure from the first floor of the building structure. In some embodiments of the present disclosure, the type of the external excitation may also be a strong wind, and the strong wind may be input into the current building structure from any floor of the building structure and may be input into the current building structure from a plurality of floors of the current building structure simultaneously. The specific type of the external excitation is not a limitation of one or more embodiments of the present disclosure.

Figure 2:
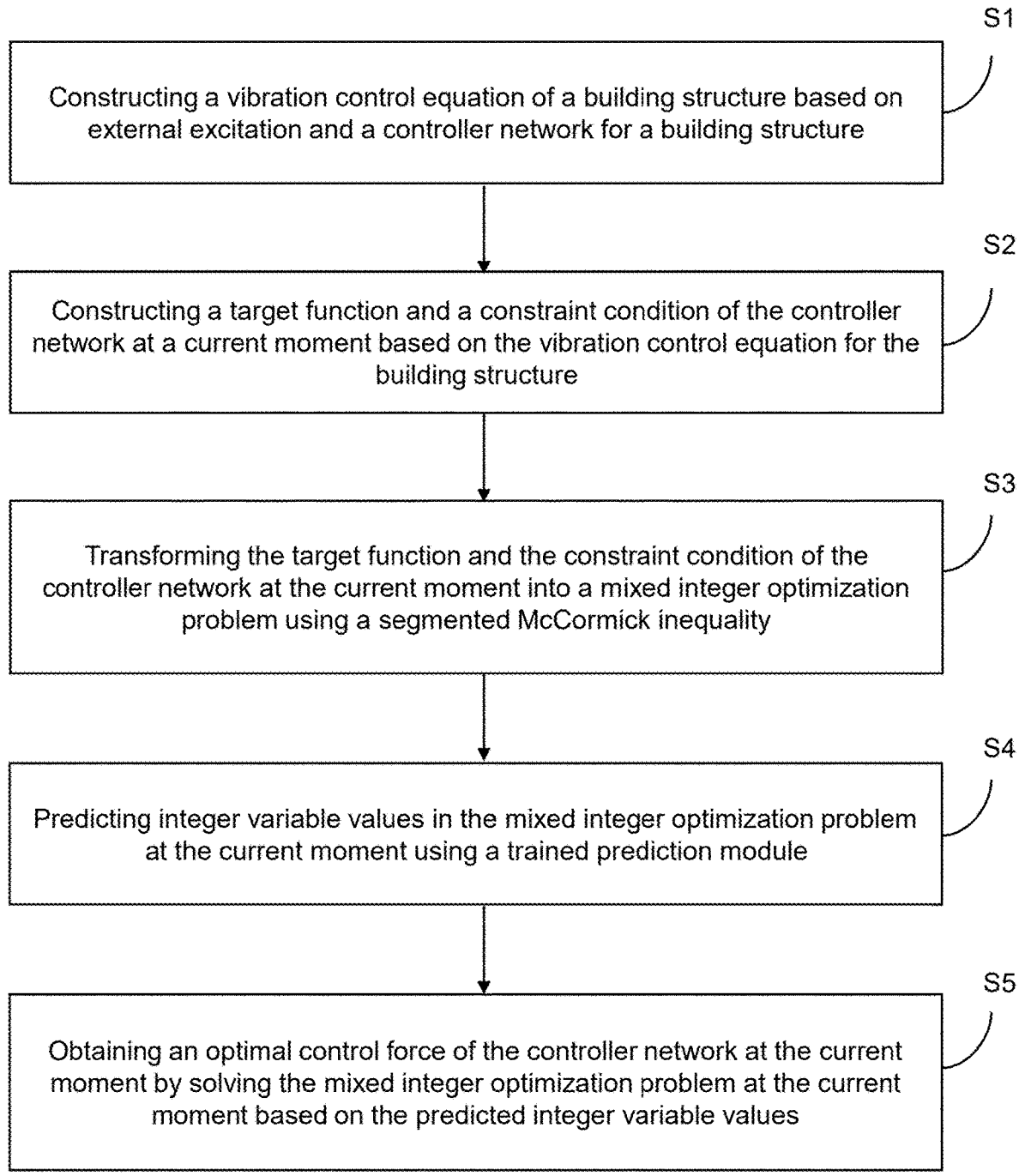
FIG. 2 is a flowchart of a method for determining an optimal control force of a building structure according to some embodiments of the present disclosure.

The method for determining an optimal control force of a building structure is provided by some embodiments of the present disclosure, as shown in FIG. 2, the method includes following steps:

S1, constructing a vibration control equation of the building structure based on an external excitation and a controller network for the building structure; wherein the controller network consists of a plurality of dampers within the building structure;

S2, constructing a target function and a constraint condition of the controller network at a current moment based on the vibration control equation for the building structure;

S3, transforming the target function and the constraint condition of the controller network at the current moment into a mixed integer optimization problem using a segmented McCormick inequality from a server;

S4, predicting integer variable values in the mixed integer optimization problem at the current moment using a trained prediction module, wherein the prediction module is trained in a cloud server and pre-stored in a processor;

S5, obtaining an optimal control force of the controller network at the current moment by solving the mixed integer optimization problem at the current moment based on the predicted integer variable values to adjust the damping coefficients of a plurality of dampers.

More specific descriptions on steps S1-S5 can be found in the corresponding related descriptions later.

The external excitation is an external load acting on the building structure that causes vibration or deformation of the building structure. In some embodiments, the external excitation may be described by a type and a mode of external excitation, wherein the type of external excitation may include various natural factors, such as strong wind, earthquake, etc., and the mode of external excitation may include a direction and a magnitude of the external excitation.

The controller network is a network including devices used to control the building structure to resist external loads. In some embodiments, the controller network includes a plurality of dampers within the building structure.

The optimal control force is a preferred coefficient associated with controlling t the building structure to resist the external loads.

In some embodiments, the optimal control force at the current moment is used to adjust the damping coefficients of the plurality of dampers.

S1 also includes the following substep.

S11, constructing a vibration control operational equation of the building structure.

In some embodiments, the vibration control operational equation of the building structure may be:

$$M\ddot{q}(t) + C\dot{q}(t) + Kq(t) = \tilde{f}(t)B_f + \tilde{w}(t)B_w,$$

wherein M is a mass matrix of the building structure, C is a damping matrix of the building structure, K is a stiffness matrix of the building structure, $B_f$ is a position matrix of one or more controllers in the building structure, $B_w$ is a position matrix of the external excitation in the building structure, and M, C, K, $B_f$, are parameter matrices that may be obtained from engineering drawings of the building structure; $B_w$ is determined by the type of the external excitation and a specific situation of the current building structure input by the external excitation, and is also a parameter matrix. Each element of $B_f$ represents an existence situation of the controllers on each floor of the building structure. In some embodiments, for the element of $B_f$, a value of 1 means that the controller exists on the floor corresponding to the element, and a value of 0 means that the controller does not exist on the floor corresponding to the element.

In other embodiments, since both ends of a controller may be used to control the floor plate of the adjacent upper floor and/or the adjacent lower floor, the element value in $B_f$ is 1 or −1, indicating that the controller of the floor corresponding to the current element controls the floor plate of the adjacent upper floor or the adjacent lower floor, and the element value is 0, indicating that there is no controller on the floor corresponding to the current element. Correspondingly, the vibration control operational equation of the building structure may also be:

$$M\ddot{\tilde{q}}(t) + C\dot{\tilde{q}}(t) + K\tilde{q}(t) = B_f\tilde{f}(t) + B_w\tilde{w}(t),$$

where $\ddot{\tilde{q}}(t)$, $\dot{\tilde{q}}(t)$, and $\tilde{q}(t)$ are a displacement vector, a velocity vector, and an acceleration vector of the building structure with respect to ground at a moment t, respectively; $\tilde{f}(t)$ is a control force vector of the controller network of the building structure at the moment t, $\tilde{f}(t)$ is a column vector; $\tilde{w}(t)$ is a vector indicating the magnitude of the external excitation at the moment t, and $\tilde{q}(t)$, $\dot{\tilde{q}}(t)$, $\ddot{\tilde{q}}(t)$, $\tilde{f}(t)$, $\tilde{w}(t)$ are column vectors and are continuous variables that change with the moment t.

The displacement vector, the velocity vector, and the acceleration vector are obtained based on a plurality of sensors within the building structure, such as displacement sensors, velocity sensors, and acceleration sensors. Parameter matrices such as M, C, K, $B_f$, $B_w$, etc., are stored in the server.

For example, the mth element in $B_f$ is 0, which indicates that there is no controller at the mth floor in the building structure, i.e., there is no damper at the mth floor in the building structure; the magnitude of the value of the 1st element in $\tilde{f}(t)$ indicates the magnitude of the control force of the controller of the first floor in the building structure at the moment t. Because in some embodiments of the present disclosure, the controller of a floor is a single controller abstracted by calculating all the dampers in that floor.

S12, after writing the vibration control operational equation of the building structure in a state space form, discretizing the vibration control operational equation using a zero-order keeper to obtain a vibration control state equation of the building structure as follows:

$$\tilde{x}_{s+1} = A\tilde{x}_s + B_f\tilde{f}_s + B_w\tilde{w}_s, \tilde{x}_s = \left[\tilde{q}_s^T, \dot{\tilde{q}}_s^T\right]^T,$$

wherein s denotes a discrete sampling point, $\tilde{x}_{s+1}$ denotes a state vector of the building structure at a (s+1)th discrete sampling point, which indicates a state vector of the building structure at a moment of (s+1)*Δt; $\tilde{x}_s$ denotes a state vector of the building structure at a sth discrete sampling point, which indicates a state vector of the building structure at a moment of s*Δt; $\tilde{f}_s$ denotes a control force vector of the building structure at the moment of s*Δt, $\tilde{w}_s$ denotes a vector indicating the magnitude of the external excitation at the moment of s*Δt, $\tilde{x}_{s+1}$ is a state vector of the building structure at a next moment of $\tilde{x}_s$, and there is an interval of Δt between $\tilde{x}_{s+1}$ and $\tilde{x}_s$; A denotes a system matrix of the building structure, which is a parameter matrix that may be obtained from engineering drawings of the building structure; $\tilde{q}_s$ is a displacement vector of the building structure with respect to the ground at the moment of s*Δt; $\dot{\tilde{q}}_s$ is a velocity vector of the building structure with respect to the ground at the moment of s*Δt; $\tilde{q}_s^T$ is a transpose of $\tilde{q}_s$ and $\dot{\tilde{q}}_s^T$ is a transpose of $\dot{\tilde{q}}_s$, and $\tilde{q}_s$, $\dot{\tilde{q}}_s$, $\tilde{x}_s$ and $\tilde{x}_{s+1}$ are column vectors.

In some embodiments, the parameter matrix A is stored in the server.

The system matrix and state vector are terms used in the art. Definition of the system matrix of the building structure and the state vector, a method for obtaining the system matrix of the building structure based on determined the building structure, and a method for obtaining the state vector based on velocities and displacements of floor vibrations in the building structure, referring to "Model Prediction of the building structure under Earthquakes based on Acceleration Feedback" (Mei G, Kareem A, Kantor J C. Model Predictive Control of Structures under Earthquakes using Acceleration Feedback [J]. Journal of Engineering Mechanics,2002, 128(5): 574-585.DOI:10.1061/(ASCE) 0733-9399(2002)128: 5(574).).

The vibration control operational equation obtained in S11 is a vibration control equation in a continuous time period, and the vibration control state equation obtained in S12 is a vibration control equation at each discrete sampling time point by once sampling the vibration control equation in S11 at an interval of Δt.

The following is also included in S2:
constructing the target function of the controller network in the building structure at the current moment as follows:
$(X^{BO}, F^{BO})=\arg \min_{X,F}J(X, F; x_0)$,
The constraint condition is $$\begin{cases} x_{k+1} = Ax_k + B_f f_k \\ (v_k^{rel})^T f_k + f_k^T D f_k \leq 0 \\ f^{min} < f_k < f^{max} \\ x^{min} < x_{k+1} < x^{max} \end{cases}.$$

where $x_0$ is a state vector of the building structure at the current moment, which may be obtained based on the Kalman filtering manner and the floor acceleration at the current moment captured by the sensors in the building structure, i.e., $x_0=\tilde{x}_1$ when the moment of s. Δt is the current moment.

X denotes a state matrix of the building structure at a future moment, and F is a control force matrix of the controller network in the building structure at the current and future moments, $X=x_1, \ldots, x_k, \ldots, X_{p-1}, x_p$], F=[$f_0$, $f_1, \ldots, f_k, \ldots, f_{p-1}$], wherein $0 \leq k \leq p-1$, $p \geq 2$, and k, p are positive integers. Xx is a state vector of a next moment of $x_{k-1}$, which is a column vector; $f_0$ is a control force vector of the building structure at the current moment, which consists of control forces of the controllers in the building structure at the current moment, and $f_k$ is a control force vector of the next moment of $f_{k-1}$, which is a column vector.

There is an interval of Δt time between neighboring moments, in this embodiment, p=20, Δt=0.02 s, and J(·) denotes the target function of the controller network of the building structure at the current moment and is a quadratic function about X and F. $X^{BO}$ denotes an optimal state matrix of the building structure at future moments, i.e., the optimal value of the state matrix X, and $F^{BO}$ denotes an optimal control force matrix of the controller network in the building structure at current and future moments, i.e., the optimal value of the control force matrix F.

$(X^{BO}, F^{BO})=\arg \min_{X,F}J(X, F; X_0)$ denotes that the target function $J(X,F; x_0)$ obtains its minimum value when $X=X^{BO}$ and $F=F^{BO}$. $v_k^{rel}$ denotes a relative velocity column vector of the controller network in the building structure at Δt·k from the current moment. A value of each element of $v_k^{rel}$ denotes a relative velocity column between two ends of each controller in the building structure at Δt·k from the current moment. Each element in $v_k^{rel}$ may be determined based on the corresponding element in $x_k$.

For example, the 3rd element in the $v_k^{rel}$ represents a relative velocity of the two ends of the corresponding 3rd controller in the building structure at Δt·k from the current moment, and the value of the 3rd element in the $v_k^{rel}$ may be determined based on the corresponding 3rd element in $x_k$. Determining the corresponding element within $v_k^{rel}$ based on each element in xk is prior art and will not be repeated herein.

D is an energy loss diagonal matrix of the controller network within the building structure, and is a parametric matrix whose diagonal elements are determined by the parameters of the dampers within the current building structure. $f^{min}$, $f^{max}$, $x^{min}$, and $x^{max}$ denote a control force vector when each element takes the smallest value, a control force vector when each element takes the largest value, a state vector when each element takes the smallest value, and a state vector when each element takes the largest value, respectively; ≺ is a precedence symbol which is used to compare the elements at the same position in left and right vectors; ≺ means that a value of the element in the left vector is smaller than a value of the element at the same position in the right vector.

In this embodiment, the target function of the controller network in the building structure at the current moment is $J(X, F; x_0) = X_p^T Q_p x_p + \Sigma_{k=0}^{p-1} x_k^T Q_k X_k + 2x_k^T G f_k + f_k^T R f_k$, wherein $Q_p$, $Q_k$, G, and R are a first target function parameter matrix, a second target function parameter matrix, a third target function parameter matrix, and a fourth target function parameter matrix.

In some embodiments, the optimal control force matrix for the current and future moments is stored on the server.

The control force of the controller network in the building structure at the current moment is a column vector $f_0$ in the control force matrix F, that is to say, the column vector $f_0$ is the final value to be determined. However, it is not based solely on finding the control force that minimizes the vibration amplitude of the building structure at the current moment, nor is it simply taking the control force that minimizes the vibration amplitude of the building structure at the current moment as the optimal control force of the building structure at the current moment. Instead, for the time period ΔT=Δt·p=25×0.2=5s from the current moment, a control force column vector at the current moment that may make the overall vibration amplitude of the building structure very small in the future ΔT time period is determined.

The external excitation usually exists for a time period, so vibration control of the building structure is usually required to last for a time period. The control force that minimizes the amplitude of the vibration of the building structure only at the current moment may, instead, make the amplitude of the vibration of the building structure larger at the next moment. Therefore, the optimal control force at the current moment is obtained each time in the present embodiment based on the overall vibration control effect of the building structure in the future ΔT time period from the current moment. Based on ideological guidance of this top-level design, the target function and the constraint condition in S2 are constructed.

Figure 3A:
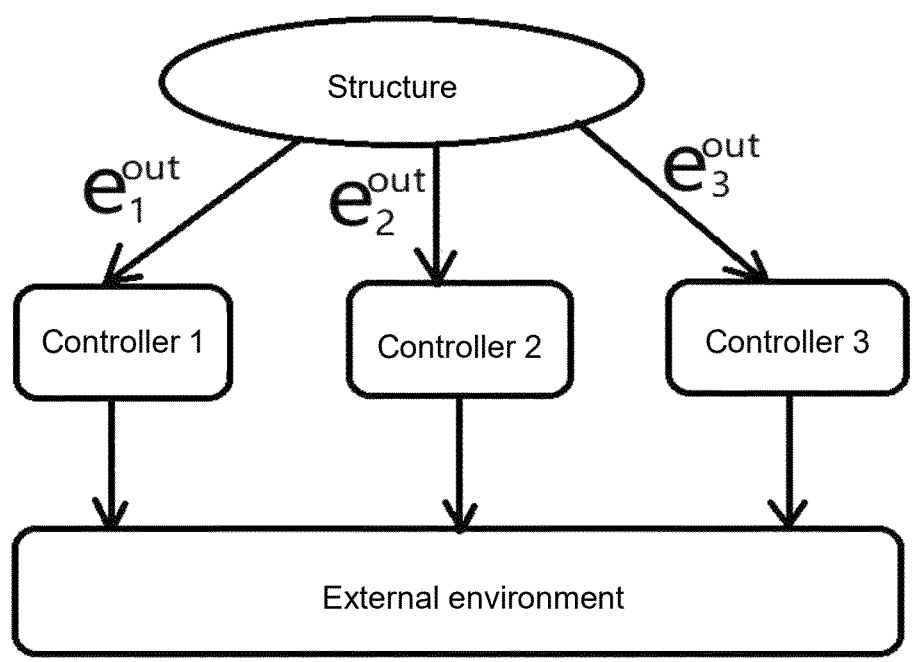
FIG. 3a is a schematic diagram of an energy flow of a semi-active control manner according to some embodiments of the present disclosure.

As shown in FIG. 3a, a schematic diagram of an energy flow of a semi-active control manner in the prior art. The controller network in FIG. 3a includes a controller 1, a controller 2, and a controller 3. The semi-active control manner in the prior art requires that a control force applied to a building structure dissipates mechanical energy of the building structure, i.e., the energy flows unidirectionally from the building structure to each controller, and the controller network then dissipates the energy in the external environment, thus the constraint condition are $e_1^{out} \geq 0$, $e_2^{out} \geq 0$, $e_3^{out} \geq 0$, wherein $e_1^{out}$, $e_2^{out}$, $e_3^{out}$ denote the energy flowing from the building structure to each controller, respectively.

Figure 3B:
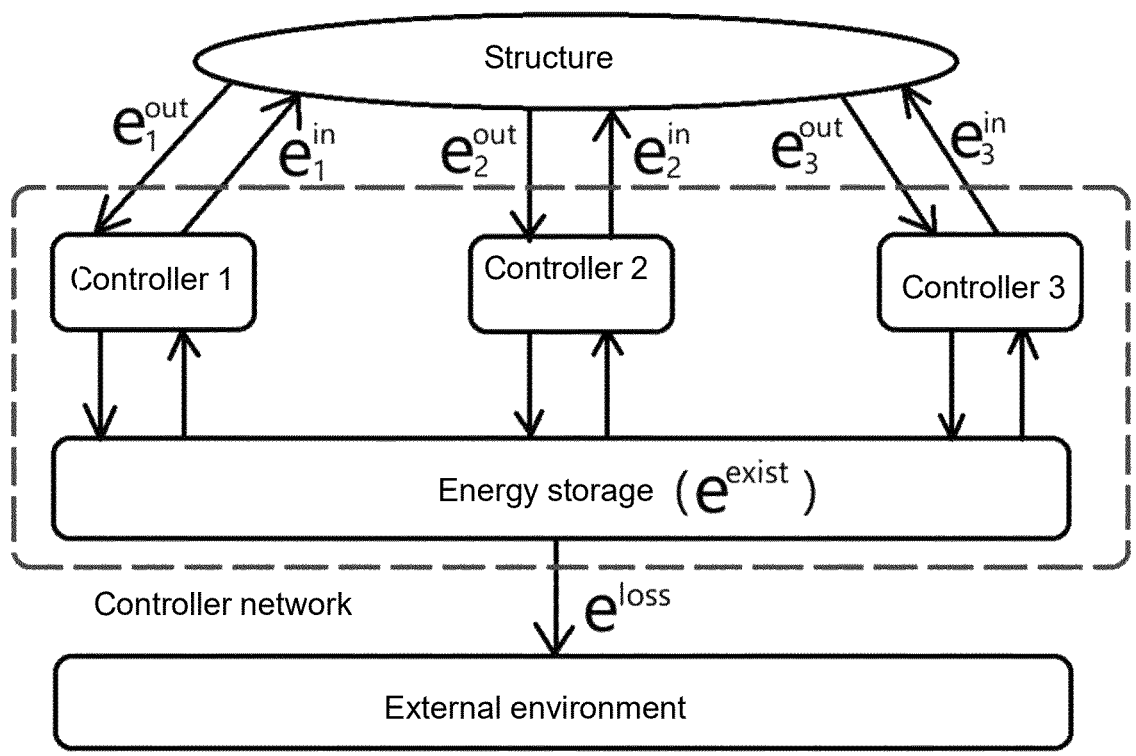
FIG. 3b is a schematic diagram of an energy flow in a method for determining an optimal control force of a building structure according to some embodiments of the present disclosure.

In this embodiment, the restrictions on the flow of energy between the building structure and the controller network are loosely constrained in order to determine a building structure control force. As shown in FIG. 3b, the controller network in FIG. 3b includes the controller 1, the controller 2, the controller 3, and an energy storage, and only requires a constraint condition to be $e_1^{in} + e_2^{in} + e_3^{in} - e_1^{out} - e_2^{out} - e_3^{out} + e^{loss} \leq e^{exist}$, where $e_1^{in}$, $e_2^{in}$, and $e_3^{in}$ denote the energy flowing from each controller to the building structure, respectively, $e^{exist}$ denotes the energy stored by the energy storage, and $e^{loss}$ denotes the energy dissipated by the controller network into the external environment. The $e^{exist}$ is made to be 0, thus ensuring that regardless of the amount of energy stored by the energy storage, the controller network as a whole does not inject energy into the building structure at any moment, i.e., the constraint condition of FIG. 3b is $e_1^{in} + e_2^{in} + e_3^{in} - e_1^{out} - e_2^{out} - e_3^{out} + e^{loss} \leq 0$.

In the constraint condition of S2, $(v_k^{rel})^T f_k$ is the total work done by all the controllers in the building structure to the building structure, which corresponds to $(e_1^{in} + e_2^{in} + e_3^{in} - e_1^{out} - e_2^{out} - e_3^{out})$ In the constraint condition of FIG. 3b; and $f_k^T D f_k$ is the energy dissipated by the controller network in the building structure into the external environment, which corresponds to $e^{loss}$ in the constraint condition of FIG. 3b. $(v_k^{rel})^T f_k + f_k^T D f_k \leq 0$ is a nonconvex constraint condition, the target function to be solved in S2 and the optimization problem which is completely equivalent to this problem cannot be solved quickly, so the target function to be solved in S2 is a nonconvex optimization problem which is NP-hard. S3 is executed next.

S3 also includes the following sub-steps:

S31, introducing a matrix of auxiliary vectors Φ at the current and future moments, $\Phi = [\Phi_0, \Phi_1, \ldots, \Phi_k, \ldots, \Phi_{p-1}]$, $0 \leq k \leq p-1$, $p \geq 2$ and k, p are integers. $\Phi_0$ is an auxiliary vector of the building structure at the current moment, and $\Phi_k$ is an auxiliary vector of a next moment of $\Phi_{k-1}$, which is a column vector. $\Phi_k$ denotes an auxiliary vector at a distance of Δt·k from the current moment, and an ith element in the auxiliary vector $\Phi_k$ is denoted as $\varphi_{k,i}$, when $\varphi_{k,i} = (D_{i,i} \cdot f_{k,i} + v_{k,i}^{rel}) \cdot f_{k,i}$, $1 \leq i \leq m$, and i is an integer, and $\varphi_{k,i}$ is a scalar, a nonconvex constraint condition $(v_k^{rel})^T f_k + f_k^T D f_k \leq 0$ is transformed into:

$$\begin{cases} \sum_{i=1}^m \varphi_{k,i} \leq 0 \\ \varphi_{k,i} = z_{k,i} \cdot f_{k,i} \\ z_{k,i} = D_{i,i} \cdot f_{k,i} + v_{k,i}^{rel} \end{cases},$$

wherein $D_{i,i}$ denotes a value of an element in an ith column of an ith row of an energy loss diagonal matrix D, indicating an energy loss of an ith controller within the building structure; $f_{k,i}$ denotes a value taken by the ith element of the control force vector $f_k$, representing a control force of the ith controller within the building structure, and $v_{k,i}^{rel}$ represents a value taken by the ith element of $v_k^{rel}$, and represents a relative velocity of ends of the ith controller within the building structure at the distance of Δt·k from the current moment, $z_{k,i}$ denotes an intermediate variable of the ith controller within the building structure at the distance of Δt·k from the current moment. The controllers of the building structure are recorded as the first controller, the second controller, . . . , the ith controller, . . . in an ascending order of the distance between the controller and the ground in the building structure. The ih controller is not necessarily on the ith floor of the building structure.

the intermediate variable $Z_{k,i}$ is used to characterize the energy loss $D_{i,i}$ of the ith controller within the building structure at the distance of $\Delta t \cdot k$ from the current moment, the control force $f_{k,i}$ of the ith controller, and a change relationship between the relative velocity $v_{k,i}^{rel}$ at the ends of the ith controller; the ith element in the auxiliary vector $\Phi_k$ is noted as $\varphi_{k,i}$ and used to characterize a change relationship between the intermediate variable $z_{k,i}$ at the distance of $\Delta t \cdot k$ from the current moment and the control force $f_{k,i}$ of the ith controller.

S32, dividing $f_{k,i} \in [\min(f_{k,i}), \max(f_{k,i})]$ and $z_{k,i} \in [\min(z_{k,i}), \max(z_{k,i})]$ equally into r segments, and using a segmented McCormick inequality to determining $r^2$ feasible domains of a nonconvex constraint $\varphi_{k,i}=z_{k,i} \cdot f_{k,i}$ corresponding to $z_{k,i}$ in a $j_1$st segment and $f_{k,i}$ in a $j_2$nd segment, wherein $j_1=1,2,\ldots,r$, $j_2=1,2,\ldots,r$:

$$\begin{cases} \varphi_{k,i}^{j_1,j_2} \leq \max(z_{k,i}^{j_1})f_{k,i}^{j_2} + z_{k,i}^{j_1}\min(f_{k,i}^{j_2}) - \max(z_{k,i}^{j_1})\min(f_{k,i}^{j_2}) \\ \varphi_{k,i}^{j_1,j_2} \leq \min(z_{k,i}^{j_1})f_{k,i}^{j_2} + z_{k,i}^{j_1}\max(f_{k,i}^{j_2}) - \min(z_{k,i}^{j_1})\max(f_{k,i}^{j_2}) \\ \varphi_{k,i}^{j_1,j_2} \geq \min(z_{k,i}^{j_1})f_{k,i}^{j_2} + z_{k,i}^{j_1}\min(f_{k,i}^{j_2}) - \min(z_{k,i}^{j_1})\min(f_{k,i}^{j_2}) \\ \varphi_{k,i}^{j_1,j_2} \geq \max(z_{k,i}^{j_1})f_{k,i}^{j_2} + z_{k,i}^{j_1}\max(f_{k,i}^{j_2}) - \max(z_{k,i}^{j_1})\max(f_{k,i}^{j_2}) \end{cases},$$

wherein max(·) denotes a maximum function, that is, taking the maximum value in the brackets, min(·) denotes a minimum function, that is, taking the minimum value in the brackets, $z_{k,i}^{j_1}$ denotes a value of $z_{k,i}$ on the $j_1$th segment, $f_{k,i}^{j_2}$ denotes a value of $f_{k,i}$ on the j2nd segment, $\varphi_{k,i}^{j_1,j_2}$ denotes a value of $\varphi_{k,i}$ corresponding to the $z_{k,i}$ on the $j_1$th segment and the $f_{k,i}$ on the j2nd segment, $\min(z_{k,i}) \leq \min(z_{k,i}^{j_1}) \leq \max(z_{k,i}^{j_1}) \leq \max(z_{k,i})$, $\min(f_{k,i}) \leq \min(f_{k,i}^{j_2}) \leq \max(f_{k,i}^{j_2}) \leq \max(f_{k,i}) \leq \min(f_{k,i})$, and $\max(f_{k,i})$ are determined from the parameters of the ith controller in the building structure, and upper and lower boundaries of $v_{k,i}^{rel}$ may be determined by the maximum allowable displacement of the floor on which the ith controller in the building structure is located and by the self-resonant frequency of the building structure, meaning that $\min(f_{k,i})$ and $\max(f_{k,i})$ may also be determined by prior art.

After $[\min(z_{k,i}), \max(z_{k,i})]$ is equally divided into r segments:

when $$j_1 = 1, z_{k,i}^{j_1} \in \left[\min(z_{k,i}), \min(z_{k,i}) + \frac{\max(z_{k,i}) - \min(z_{k,i})}{r}\right).$$

when $$1 < j_1 < r \text{时}, z_{k,i}^{j_1} \in \left[\min(z_{k,i}) + \frac{\max(z_{k,i}) - \min(z_{k,i})}{r} \times (j_1 - 1),\right.$$

$$\left.\min(z_{k,i}) + \frac{\max(z_{k,i}) - \min(z_{k,i})}{r} \times j_1\right), \text{ and}$$

when $$j_1 = r, z_{k,i}^{j_1} \in \left[\min(z_{k,i}) + \frac{\max(z_{k,i}) - \min(z_{k,i})}{r} \times (j_1 - 1), \max(z_{k,i})\right].$$

The specific segmentation of $[\min(f_{k,i}), \max(f_{k,i})]$ after being divided equally into r segments is the same as $[\min(z_{k,i}), \max(z_{k,i})]$ and will not be repeated here.

For $f_{k,i} \in [\min(f_{k,i}), \max(f_{k,i})]$ and $z_{k,i} \in [\min(z_{k,i}), \max(z_{k,i})]$, which are equally divided into r segments, when delineating the feasible domains, there exist $r^2$ feasible domains because of the existence of $r^2$ distinct pairs of $(j_1, j_2)$, leading to a count of the sets of McCormick inequality used to delineate the feasible domains of $\varphi_{k,i}$ also being $r^2$.

In this embodiment, r is taken to be an integer of 4 or more for the following reasons:

$$\sum_{i=1}^{m} \varphi_{k,i} \leq 0, \text{ and } z_{k,i} = D_{i,i} \cdot f_{k,i} + v_{k,i}^{rel}$$

are the linear constraint condition, only $\varphi_{k,i}=z_{k,i} \cdot f_{k,i}$ is the nonconvex constraint condition.

Figure 4A:
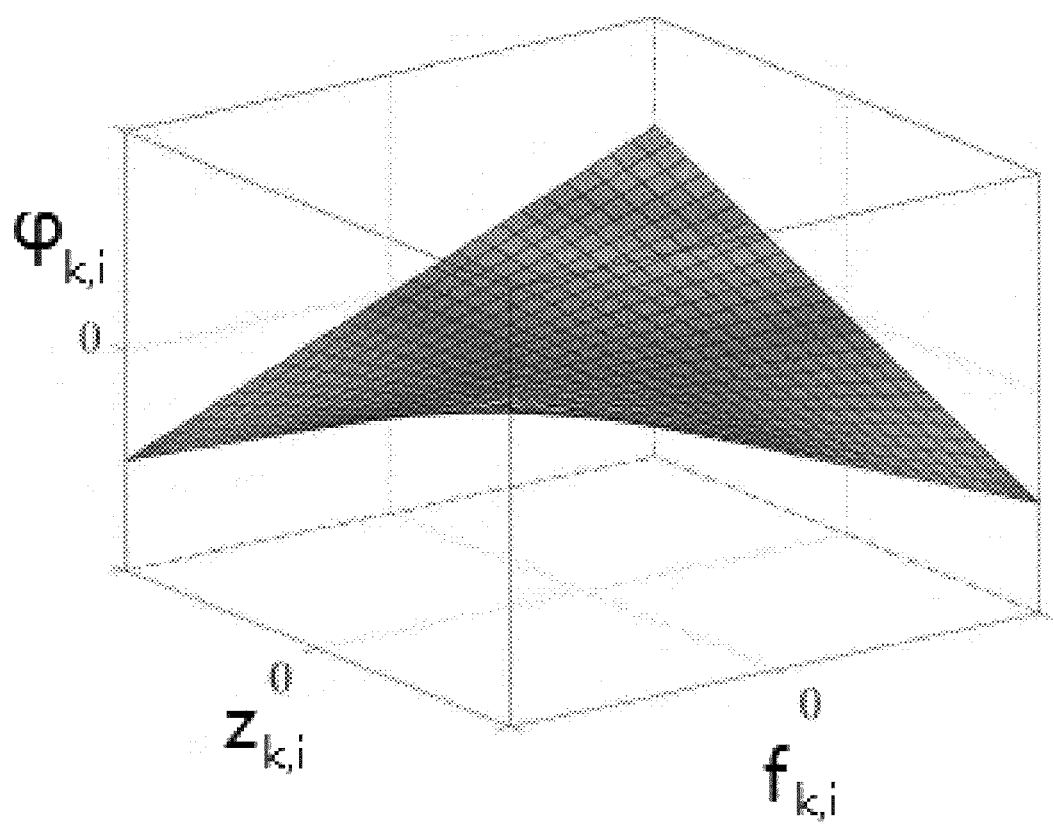
FIG. 4a is a surface corresponding to a nonconvex constraint condition $\varphi_{k,i}=Z_{k,i}\cdot f_{k,i}$ according to an embodiment 1 of the present disclosure.
Figure 4B:
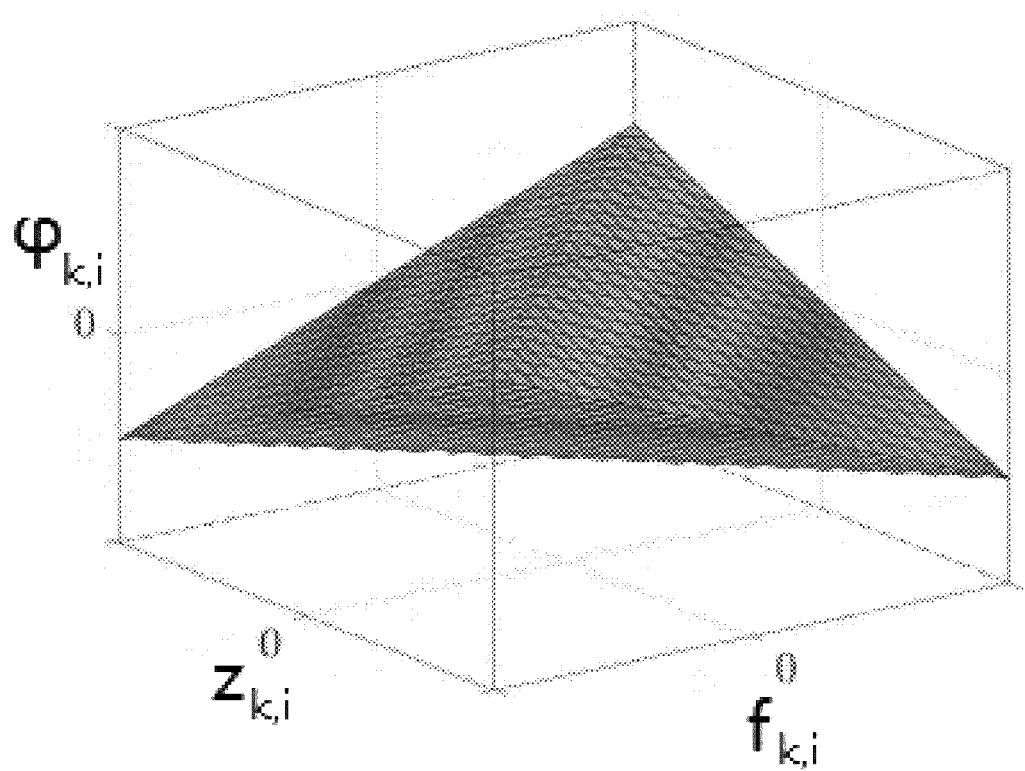
FIG. 4b to FIG. 4d are feasible domains circled by transforming the nonconvex constraint condition $\varphi_{k,i}=z_{k,i}\cdot f_{k,i}$ according to a McCormick inequality based on a different count of segments according to the embodiment 1 of the present disclosure.

As shown in FIG. 4a, it is a surface corresponding to a nonconvex constraint condition $\varphi_{k,i}=z_{k,i} \cdot f_{k,i}$ fitted by using the computer software, which is denoted as a target surface. As shown in FIG. 4b, the McCormick inequality when r=1 is an unsegmented McCormick inequality, in which four planes formed by the unsegmented McCormick inequality (one set of McCormick inequality corresponds to four planes) are used to encircle the target surface from above and below the target surface (two planes above the target surface, two planes below the target surface) to circle the feasible domain. But the feasible domain also includes many irrelevant regions that are not the target surface, so the unsegmented McCormick inequality when r=1 is not able to circle the feasible domain of the nonconvex constraint condition $\varphi_{k,i}=z_{k,i} \cdot f_{k,i}$ accurately.

Figure 4C:
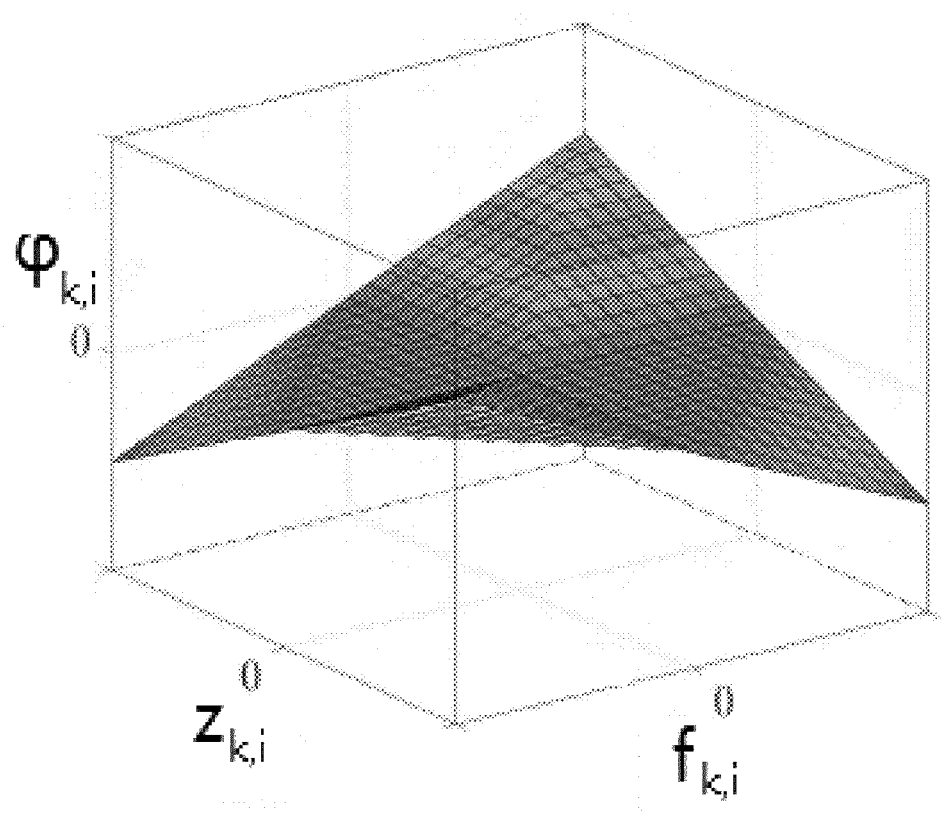

As shown in FIG. 4c, the feasible domain is circled using 16 planes formed by the segmented McCormick inequality when r=2 (8 planes above the target surface and 8 planes below the target surface), which shows that the 16 planes stitched together are closer in shape to the target surface compared to FIG. 4b, resulting in a decrease in the irrelevant region in the feasible domain.

As shown in FIG. 4c, the 64 planes formed by the segmented McCormick inequality when r=4 are used to circle the feasible domain (32 planes above the target surface and 32 planes below the target surface), at this point, the 64 planes stitched together are already very close in shape to the target planar surface, and the circled feasible domain is closely centered around the target surface as well.

Figure 4D:
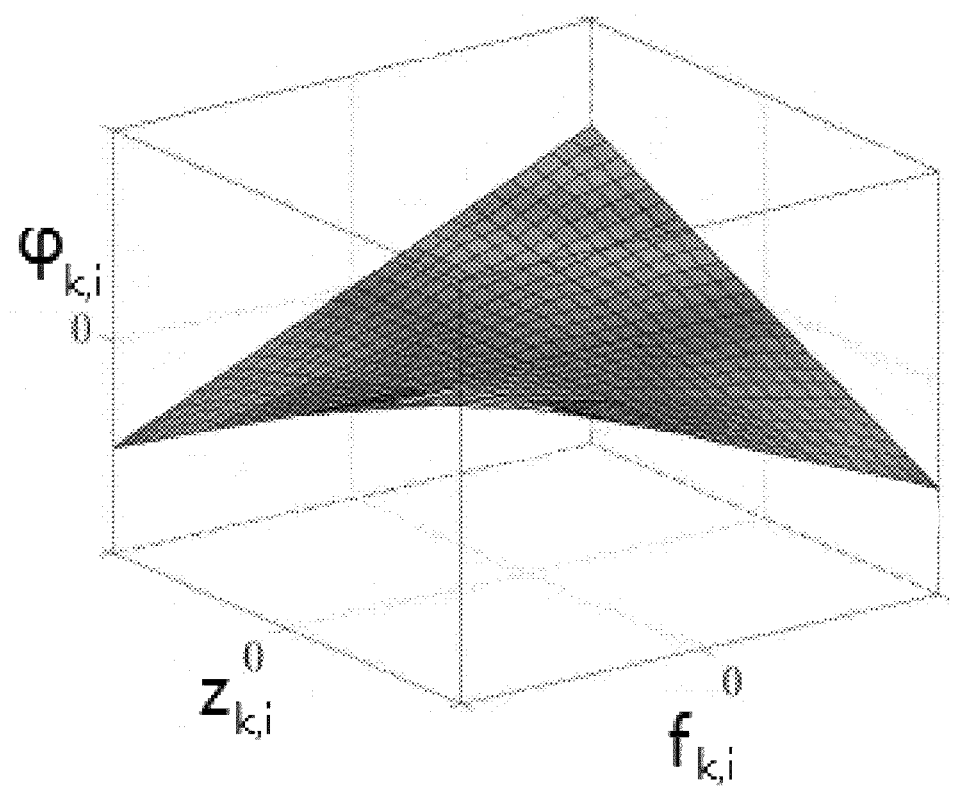

As shown in FIG. 4d, the feasible domain is circled by using a plurality of planes formed by the segmented McCormick inequality when r>4. Compared with FIG. 4c, the planes stitched together at this time are closer in shape to the target surface, and the feasible domain is more closely centered around the target surface.

It can be seen that the feasible domain circled using the segmented McCormick inequality becomes more and more accurate as the value of r takes on a larger value, and so r takes on an integer of 4 or more in this embodiment.

In some embodiments, the segmented McCormick inequality is obtained from the server.

S33, after labeling the $r^2$ feasible domains with integer numbers $\xi_{k,i}=\{1, 2, \ldots, r^2\}$, transforming the target function and the constraint condition at the current moment into the mixed integer optimization problem, wherein:

a target function of the mixed integer optimization problem is:

$$(X^{BO}, F^{BO}, \Phi^{BO}, \Xi^{BO})=\arg \min_{X,F,\Phi,\Xi} J(X, F; X_0),$$

the constraint condition is:

$$x_{k+1} = Ax_k + Bf_k$$

$$\sum_{i=1}^{m} \varphi_{k,i} \leq 0$$

$$z_{k,i} = D_{i,i}f_{k,i} + v_{k,i}^{rel}$$

$$\varphi_{k,i}^{\xi_{k,i}} \leq \max(z_{k,i}^{\xi_{k,i}})f_{k,i}^{\xi_{k,i}} + z_{k,i}^{\xi_{k,i}}\min(f_{k,i}^{\xi_{k,i}}) - \max(z_{k,i}^{\xi_{k,i}})\min(f_{k,i}^{\xi_{k,i}})$$

$$\varphi_{k,i}^{\xi_{k,i}} \leq \min(z_{k,i}^{\xi_{k,i}})f_{k,i}^{\xi_{k,i}} + z_{k,i}^{\xi_{k,i}}\max(f_{k,i}^{\xi_{k,i}}) - \min(z_{k,i}^{\xi_{k,i}})\max(f_{k,i}^{\xi_{k,i}})$$

$$\varphi_{k,i}^{\xi_{k,i}} \geq \min(z_{k,i}^{\xi_{k,i}})f_{k,i}^{\xi_{k,i}} + z_{k,i}^{\xi_{k,i}}\min(f_{k,i}^{\xi_{k,i}}) - \min(z_{k,i}^{\xi_{k,i}})\min(f_{k,i}^{\xi_{k,i}})$$

$$\varphi_{k,i}^{\xi_{k,i}} \geq \max(z_{k,i}^{\xi_{k,i}})f_{k,i}^{\xi_{k,i}} + z_{k,i}^{\xi_{k,i}}\max(f_{k,i}^{\xi_{k,i}}) - \max(z_{k,i}^{\xi_{k,i}})\max(f_{k,i}^{\xi_{k,i}})$$

$$\xi_{k,i} = \{1, 2, \ldots, r^2\}$$

$$(v_k^{rel})^T f_k + f_k^T Df_k \leq 0$$

$$f^{min} \leq f_k \leq f^{max}$$

$$x^{min} \leq x_{k+1} \leq x^{max}$$

wherein $\Phi^{BO}$ denotes an optimal auxiliary vector matrix of the building structure at the current and future moments; $\Xi$ denotes a set of integer numbers corresponding to a feasible domain of the constraint condition when the building structure is at the current and future moments, $\Xi = \{\xi_0, \xi_1, \ldots, \xi_k, \ldots, \xi_{p-1}\}$, $\xi_0$ denotes a set of integer numbers corresponding to the feasible domain of the constraint condition when the building structure is at the current moment, $\xi_k$ denotes a set of integer numbers corresponding to the feasible domain of the constraint condition when the building structure is at the distance of $\Delta t \cdot k$ from the current moment, $\xi_k$ is a set of integer numbers corresponding to the feasible domain of the constraint condition when the building structure is at a next moment of $\xi_{k-1}$, $\Xi^{BO}$ denotes a set of integer numbers corresponding to optimal feasible domains of the building structure at the current and future moments, which means that an optimal control force matrix $F^{BO}$ of the building structure at the current and future moments is calculated based on the integer numbers corresponding to the optimal feasible domains in $\Xi^{BO}$; $\xi_{k,i}$ denotes an integer number of the feasible domain of the constraint condition when the ith controller of the building structure is at the distance of $\Delta t \cdot k$ from the current moment, and $(X^{BO}, F^{BO}, \Phi^{BO}, \Xi^{BO}) = \arg\min_{X,F,\Phi,\Xi} J(X, F; x_0)$ denotes that the target function $J(X,F; x_0)$ is minimized when $X = X^{BO}$, $F = F^{BO}$, $\Phi = \Phi^{BO}$, and $\Xi = \Xi^{BO}$.

For example, although there are $r^2$ feasible domains of the constraint condition for the ith controller in the current building structure at the distance of $\Delta t \cdot k$ from the current moment, the optimal control force for the ith controller in the building structure at the distance of $\Delta t \cdot k$ from the current moment obtained finally, that is, the column vector $f_k^{BO}$ in the optimal control force matrix $F^{BO} = [f_0^{BO}, f_1^{BO}, \ldots, f_k^{BO}, \ldots, f_{p-1}^{BO}]$, is corresponding to one of the $r^2$ feasible domains.

Because $\Xi^{BO}$ is still unknown at this point, the mixed integer optimization problem in S33 is still a nonconvex optimization problem. The mixed integer optimization problem is transformed into a convex optimization problem that can be solved quickly by predicting the $\Xi^{BO}$, i.e., predicting the integer variable values in the mixed integer optimization problem.

Figure 7:
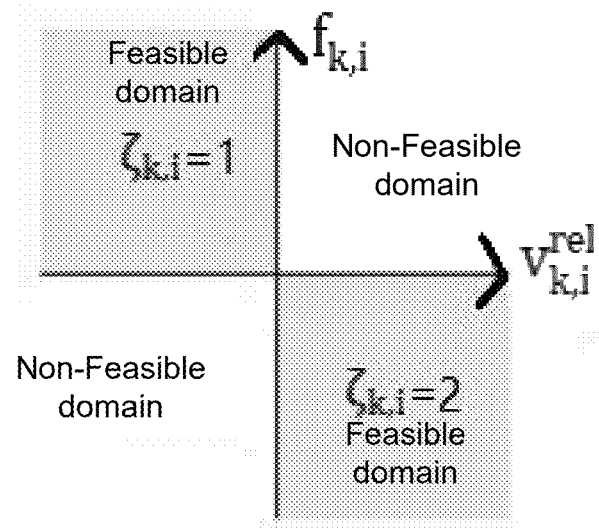
FIG. 7 is a schematic diagram of feasible domains of $v_{k,i}^{rel}$ and $f_{k,i}$ in a semi-active control manner according to some embodiments of the present disclosure.

It should be emphasized here that, for the control force solution in the semi-active control manner in the prior art, since $v_{k,i}^{rel}$ and $f_{k,i}$ are both scalars, the feasible domain circled by $v_{k,i}^{rel} \cdot f_{k,i} \leq 0$ can be clearly expressed as the concatenation of two convex regions as shown in FIG. 7, and thus $v_{k,i}^{rel} \cdot f_{k,i} \leq 0$ may be written as:

$$\begin{cases} v_{k,i}^{rel} \leq 0, -f_{k,i} \leq 0, \zeta_{k,i} = 1 \\ -v_{k,i}^{rel} \leq 0, f_{k,i} \leq 0, \zeta_{k,i} = 2 \end{cases},$$

$\xi_{k,i}$ is used to label the integer number of the feasible domain where $v_{k,i}^{rel}$ and $f_{k,i}$ are located.

For the method for determining an optimal control force in one or more embodiments of the present disclosure, since $v_{k,i}^{rel}$ and $f_{k,i}$ are vectors, the feasible domain circled by the constraint condition $(v_k^{rel})^T f_k + f_k^T Df_k \leq 0$ in S2 is a very complex space (as shown in FIGS. 4a to 4d), which is difficult to be simply partitioned into a plurality of convex spaces and be represented in a similar way as $$\begin{cases} v_{k,i}^{rel} \leq 0, -f_{k,i} \leq 0, \zeta_{k,i} = 1 \\ -v_{k,i}^{rel} \leq 0, f_{k,i} \leq 0, \zeta_{k,i} = 2 \end{cases}.$$

Thus, the problem is solved by transforming the target function and the constraint condition at the current moment into a mixed integer optimization problem by using the technical means described in S3 and its sub-steps.

S4 also includes the following sub-steps:

S41, constructing a training set.

S41 also includes the following sub-steps:

S411, generating an external excitation time-range with a spectrum characteristic being consistent with a specification, acting the external excitation time-range with a spectrum characteristic on the building structure, and obtaining a real-time state vector of the building structure based on sensors in the building structure.

The external excitation time-range refers to a magnitude of the external excitation such as earthquake, typhoon, etc., e.g., a vibration amplitude/wind velocity/direction, etc., which varies with time, and different external excitation time-ranges correspond to different spectrum characteristics, and the specification may include, e.g., Code for Seismic Design of Buildings GB50011-2010 (2016 Edition).

S412, determining, using a first solver, a set of optimal integer numbers of the feasible domain of the constraint condition when the building structure is in a corresponding future moment based on state vectors of the building structure at different moments, noting the state vector of the building structure at any moment as $x_0^{(N)}$, then noting a set of optimal integer numbers of the feasible domain of the constraint condition in a future moment corresponding to $x_0^{(N)}$ as $\Xi^{(N)} = \{\xi_0^{(N)}, \xi_1^{(N)}, \ldots, \xi_k^{(N)}, \ldots, \xi_{p-1}^{(N)}\}$, wherein N is an integer greater than 1, $x_0^{(N)}$ is a Nth input in the training set, $\Xi$ is a Nth output in the training set, the training set formed by an input and an output of the training set together, and a data pair $\{x_0^{(N)}, \Xi^{(N)}\}$ is a Nth pair of samples in the training set.

In this embodiment, the first solver is a commercial solver, such as the BMIBNB solver that comes with the YALMIP software package, and using the computational capability of the commercial solver, the integer number of the feasible domain of the constraint condition to which the optimal control force of the building structure belongs is determined based on the state vector of the building structure at the current moment, and the type of solver is not a limitation on one or more embodiments of the present disclosure.

S413, calculating an increasing count of samples in the training set using a Good-Turing smoothing manner until a calculation result of the Good-Turing smoothing manner exceeds a first threshold, and the training set being no longer adding new samples.

The training set with a small number of samples has a poor representation of the samples, such that the subsequent trained neural network module has a low accuracy of the output results. In some embodiments of the present disclosure, although a higher number of samples is better, a large amount of computational and storage resources can also be consumed in order to obtain too many samples. Therefore, it is necessary to stop adding samples when the samples in the training set are representative enough. That is, first, the amount of samples in the training set is continuously increased by S411 to S412, and then the Good-Turing smoothing manner is used to calculate the amount of new samples at the time of getting a current new output. When the samples in the training set are sufficiently representative, it is also difficult to generate new outputs as the amount of new samples keeps increasing. Therefore, an upper limit of the amount of new samples when getting a new output is set as the first threshold, and when the calculation result of the Good-Turing smoothing manner still does not show a new output when it exceeds the first threshold, then it is judged that the current training set is sufficiently representative, and no new sample will be added to the training set. Training the prediction module with a sufficiently representative training set greatly improves the accuracy of the prediction module in predicting the optimal integer number of the feasible domain.

The use of the Good-Turing smoothing manner to determine whether the amount of samples in the training set is sufficiently representative is prior art and will not be repeated here.

In some embodiments, when obtaining samples for the training set, instead of sampling uniformly within the feasible domain of the constraint condition at the current moment, sampling is performed in the region of the feasible domain where samples are more concentrated.

In some embodiments, when the processor obtains the training set, the amount of training samples for each type of external excitation that is greater than a preset amount threshold, the preset amount threshold being related to a building structure parameter.

The type of the external excitation refers to a type of external load acting on the building structure. In some embodiments, the type of the external excitation includes strong winds, earthquakes, vehicle-bridge coupled vibrations, etc.

The building structure parameter is data related to building size and structural type. The structural type may include a frame structure, a shear wall structure, and so on. In some embodiments, the building structure parameter is obtained via a third-party information source and/or data source. For example, the building structure parameter is obtained from an architectural design document.

The preset amount threshold is related to the building structure parameter. For example, the more complex the building shape, the more degrees of freedom the building has, the larger the preset amount threshold. The preset amount threshold may be set empirically.

The more complex the building shape and the more degrees of freedom the building has mean that the internal structure of the building is more complex, and the more complex the vibration situation induced by the external excitation is, and at this time, more training samples are needed to increase the coverage of the training set on the vibration situation of the building, and to increase the model training effect. In some embodiments of the present disclosure, by ensuring that the amount of training samples for each type of external excitation is sufficient, the excitation prediction model can be trained to better generalize to unseen external excitation scenarios and improve the accuracy of the prediction.

S42, the prediction module being provided with h parallel DNN subneural networks, predicting the integer numbers of the optimal feasible domains by training the prediction module using the training set.

S43, predicting the integer variable values $z^{BO}$ in the mixed integer optimization problem at the current moment using the trained prediction module.

In some embodiments, the processor obtains the trained prediction module from the cloud server.

The cloud server refers to a server implemented on a cloud platform. In some embodiments, the server may be a single server or a server group. The server group may be centralized or distributed (for example, the server may be a distributed system). Merely by way of example, the cloud platform may include a private cloud, a public cloud, a hybrid cloud, a community cloud, a distributed cloud, an internal cloud, a multi-layer cloud, etc., or any combination thereof.

In some embodiments, a plurality of different trained prediction modules may be stored in the cloud server. Different trained prediction modules correspond to different r.

In some embodiments, the processor may obtain a probability distribution of spectrum characteristics of historical external excitations at a plurality of historical moments, spectrum characteristics of external excitations at the current moment, and/or predicted spectrum characteristics of external excitations at the future moment at every preset period; and determine a complexity of the external environment based on the probability distribution of the spectrum characteristics of historical external excitations at the plurality of historical moments, the spectrum characteristics of external excitations at the current moment, and/or the predicted spectrum characteristics of external excitations at the future moment; determine r of a next preset period based on the complexity of the external environment; and before the start of the next preset period, transmit the trained prediction module corresponding to the r of the next preset period from the cloud server to the local.

The preset period refers to a fixed duration, for example, 0.02 s, 0.04 s, etc.

The complexity of the external environment refers to a complexity of the environment around the building.

In some embodiments, the processor may determine the complexity of the external environment based on a weighted sum of a count of types of external excitations and standard deviations of a plurality of modes corresponding to each type of external excitation in the probability distribution of the spectrum characteristics of the external excitations at the plurality of historical moments, the spectrum characteristics of the external excitations at the current moment, and/or the spectrum characteristics of the external excitations at the future moment.

The standard deviations of the plurality of modes corresponding to each type of external excitation refers to a mean of a standard deviation of a direction of the external excitation corresponding to the plurality of modes corresponding to each type of external excitation and a standard deviation of a size of the external excitation. When obtaining the weighted sum, a weight coefficient of the count of types of external excitations and a weight coefficient of the standard deviations of the plurality of modes corresponding to each type of external excitation may be set by a person skilled in the art based on experience.

The plurality of modes corresponding to the type of external excitation refer to modes of external excitation corresponding to the plurality of spectrum characteristics corresponding to the type of external excitation in the probability distribution of the spectrum characteristics of the external excitation at the plurality of historical moments, the spectrum characteristics of the external excitation at the current moment, and/or the predicted spectrum characteristics of the external excitation at the future moment.

In some embodiments, the processor may determine r of the next period through a first preset table based on the complexity of the external environment.

In some embodiments, the first preset table may be constructed based on a corresponding relationship between the complexity of the external environment and r. The corresponding relationship between the complexity of the external environment and r may be set by those skilled in the art based on experience.

In some embodiments, the processor may determine a communication idle bandwidth of the controller network in a current preset period based on a total bandwidth of the controller network and a control signal transmission load of the controller network in the current preset period; and determine a starting time point of transmission based on the communication idle bandwidth of the controller network in the current preset period.

The control signal transmission load refers to a channel transmission bandwidth occupied by transmitting an instruction of transmitting a solved control force to the controller network to adjust damping coefficients of a plurality of dampers.

In some embodiments, the processor may use a difference between the total bandwidth of the controller network and the control signal transmission load of the controller network in the current preset period as the communication idle bandwidth of the controller network in the current preset period.

The starting time point of the transmission refers to a time point when the cloud server starts to transmit the prediction module to the processor. In some embodiments, the processor uses a first time point when the communication idle bandwidth of the controller network in the current preset period is greater than a required bandwidth as the starting time point of the transmission.

The required bandwidth refers to a bandwidth required for the prediction module to be transmitted from the cloud server to the processor. In some embodiments, the required bandwidth may be set by a person skilled in the art based on experience.

In S43, open-source software PyTorch and high-performance GPUs are used to train the prediction module.

According to some embodiments of the present disclosure, the prediction module includes a neural network for predicting $\underline{z}^{BO}$ in the mixed integer optimization problem at the current moment, which is much more computationally efficient than solving using a branch-and-bound algorithm, so S3 is followed by S4.

And in the sub-step of S4, while the training set ultimately used to train the prediction module, obtained by one or more embodiments of the present disclosure via the Good-Turing smoothing manner, is sufficiently representative, the amount of samples in the sufficiently representative training set is huge. The use of the prediction module including h parallel DNN subneural networks in one or more embodiments of the present disclosure, as compared to a prediction module including only one DNN neural network in the prior art, ensures that the prediction results are of high accuracy while also having the following unique advantages:

① Dramatically Reduce the Computation Overhead and the Consumption of Memory Resources, Saving Video Memory.

If the prediction module is expected to be trained to make accurate predictions, the count of neurons in the last hidden layer within the prediction module must be greater than the count of neurons in the output layer (established conclusion). So if a prediction module including one DNN neural network is used to predict one billion possibilities, there are one billion neurons in the output layer of the prediction module, and even more than one billion neurons in the hidden layer; and if a prediction module including three parallel DNN subneural networks is used, each subneural network only needs to output $1000000000^{1/3}$ possibilities, i.e., each subneural network only needs 1000 neurons in the output layer, and the neurons in the hidden layer of each subneural network also only need more than 1000, which reduces the total count of neurons in the prediction module by at least six orders of magnitude. So setting up parallel h DNN subneural networks within the prediction module greatly reduces the count of neurons within the prediction module and shrinks the overall size of the neural network, which drastically reduces the computational overhead and the occupation of memory resources and saves the video memory. Otherwise, excessive computation will not only take up a large amount of memory resources, but also lead to the explosion of graphics memory.

② Faster Prediction

Based on the analysis in ①, during the prediction process, the computational efficiency is improved, and the prediction velocity will be faster because of the drastic reduction of the computational overhead and the consumption of memory resources.

③ Pre-Training is Also More Efficient

The prediction module is trained using the training set, and the neural network is continuously optimized according to the training results in the process of training, and based on the analysis in ①, it can be seen that the overall size of the parallel DNN subneural networks in the prediction module is ultimately much smaller than that of the prediction module which uses only one DNN neural network. Thus, the computational velocity of the prediction module using parallel DNN subneural networks in the training process is much higher than that of the prediction module using only one DNN subneural network, and so the training efficiency in the early stage is also higher.

In this embodiment, the count of parallel DNN subneural networks h=3.

While the advantages of using parallel DNN subneural networks within the prediction module have been analyzed above, the count of parallel DNN subneural networks h is not necessarily to be maximized. Because the prediction accuracy of each DNN subneural network is not one hundred percent, assuming that the prediction accuracy of each DNN subneural network after training is $\beta$, the final prediction accuracy of the prediction module is $\beta^h$:

When $\beta=98\%$ and h=3, then $(98\%)^3=94.12\%$;

When $\beta=98\%$ and h=8, then $(98\%)^8=85.07\%$.

This embodiment takes h=3 after many experiments so that it can maintain a high prediction accuracy.

When h=3 and the sampling is performed from a region where the samples are more concentrated in the feasible domain, this avoids the use of a large number of noisy samples to train a particular sub-neural network to prevent the occurrence of low prediction accuracy in that sub-neural network.

S5 also include the following contents.

After solving the mixed integer optimization problem in S33 using a second solver based on the $\Xi^{BO}$ predicted by the prediction module, an optimal control force matrix $F^{BO}$ of the controller network at the current and future moments is obtained, and a column vector $f0^{BO}$ in the optimal control force matrix $F^{BO}$ is designated as the optimal control force of the controller network at the current moment.

After the $\Xi^{BO}$ predicted by the prediction module, the mixed integer optimization problem is transformed into a convex optimization problem, and the convex optimization problem can be solved based on the prior art, and will not be discussed here.

In this embodiment, the second solver is a BMIBNB solver, and the type of solver is not to be taken as a limitation on one or more embodiments of the present disclosure.

In S5, the velocity of solving the optimal control force matrix F* may also be improved by using a predefined solution procedure with a special data structure for the target function.

The BMIBNB solver is more versatile, but it can't using special data structures to improve its computational efficiency. The target function $$J(X, F; x_0) = x_p^T Q_p x_p + \sum_{k=0}^{p-1} x_k^T Q_k x_k + 2x_k^T G f_k + f_k^T R f_k$$

may expressed in terms of a particular data structure as:

$$J(X, F; x_0) = \begin{pmatrix} x_0 \\ f_0 \\ \vdots \\ x_{p-1} \\ f_{p-1} \\ x_p \end{pmatrix}^T \begin{pmatrix} Q & T & \cdots & 0 & 0 & 0 \\ T^T & R & \cdots & 0 & 0 & 0 \\ \vdots & \vdots & \ddots & \vdots & \vdots & \vdots \\ 0 & 0 & \cdots & Q & T & 0 \\ 0 & 0 & \cdots & T^T & R & 0 \\ 0 & 0 & \cdots & 0 & 0 & Q_p \end{pmatrix} \begin{pmatrix} x_0 \\ f_0 \\ \vdots \\ x_{p-1} \\ f_{p-1} \\ x_p \end{pmatrix},$$

Together with the solution program written in a basic language such as C/Java, it is much faster to solve the optimal control force matrix F* of the controller network in the building structure at the current and future moments compared to the direct use of the BMIBNB solver.

The target function $$J(X, F; x_0) = x_p^T Q_p x_p + \sum_{k=0}^{p-1} x_k^T Q_k x_k + 2x_k^T G f_k + f_k^T R f_k$$

may be directly expanded into the form of matrix multiplication and written as:

$$J(X, F; x_0) = \begin{pmatrix} x_0 \\ x_1 \\ \vdots \\ x_{p-1} \\ x_p \\ f_0 \\ f_1 \\ \vdots \\ f_{p-1} \end{pmatrix}^T \begin{pmatrix} Q & 0 & \cdots & 0 & 0 & T & 0 & \cdots & 0 \\ 0 & Q & \cdots & 0 & 0 & 0 & T & \cdots & 0 \\ \vdots & \vdots & \ddots & \vdots & \vdots & \vdots & \vdots & \ddots & \vdots \\ 0 & 0 & \cdots & Q & 0 & 0 & 0 & \cdots & T \\ 0 & 0 & \cdots & 0 & Q_p & 0 & 0 & \cdots & 0 \\ T^T & 0 & \cdots & 0 & 0 & R & 0 & \cdots & 0 \\ 0 & T^T & \cdots & 0 & 0 & 0 & R & \cdots & 0 \\ \vdots & \vdots & \ddots & \vdots & \vdots & \vdots & \vdots & \ddots & \vdots \\ 0 & 0 & \cdots & T^T & 0 & 0 & 0 & \cdots & R \end{pmatrix} \begin{pmatrix} x_0 \\ x_1 \\ \vdots \\ x_{p-1} \\ x_p \\ f_0 \\ f_1 \\ \vdots \\ f_{p-1} \end{pmatrix},$$

After the target function $J(X, F; x_0)$ is expressed with a specific data structure, a positive definite matrix in the middle is a block diagonal matrix. Making full use of this specific data structure can significantly improve the computational efficiency of the subsequent matrix operations such as QR decomposition.

In some embodiments, S5 also includes:

after solving a current mixed integer optimization problem using a third solver based on the $\Xi^{BO}$ predicted by the prediction module, obtaining the optimal control force matrix $F^{BO}$, the optimal state matrix $X^{BO}$, and a corresponding target function values $J(X^{BO}, F^{BO}; x_0)$ of the controller network in the building structure at the current and future moments; and determining, using a standby solver, a standby control matrix $F^{backup}$, a standby state matrix $X^{backup}$, and a corresponding target function standby value $J^{backup}$ at the current and future moments based on a semi-active control manner of the prior art, and if $J(X^{BO}, F^{BO}; x_0) < J^{backup}$, designating a first column vector $f_0^{BO}$ in the optimal control force matrix $F^{BO}$ as the optimal control force of the controller network in the building structure at the current moment; if $J(X^{BO}, F^{BO}; x_0) \geq J^{backup}$, designating a column vector $f_0^{backup}$ of a standby control force in the standby control matrix $F^{backup}$ as the optimal control force of the controller network in the building structure.

The standby solver used in this embodiment is a solver that uses a limiting linear quadratic conditioning algorithm. The semi-active control manner of the prior art is proposed by Scruggs J T et al. (Scruggs J T, Taflanidis A A, Iwan W D. Non-linear stochastic controllers for semiactive and regenerative systems with guaranteed quadratic performance bounds-Part 1: State feedback control. Structural Control & Health Monitoring, 2010, 14 (8): 1101-1120.)

In order to avoid the rare case where the final solved control force is less effective due to an incorrectly predicted $\Xi^{BO}$ by the prediction module, one or more embodiments of the present disclosure perform alternative schemes to play the role of a fallback at the same time in S5. By using a fast standby solver and a semi-active control manner based on existing technology, the standby control matrix, standby state matrix, and a corresponding standby value of the target function of the controller network in the building structure at current and future moments may be solved. When the value of the target function corresponding to $\Xi^{BO}$ predicted by the prediction module is greater than the standby value of the target function computed by an alternative scheme, the $\Xi^{BO}$ predicted by the prediction module is incorrect, and the control force computed in the alternative scheme is used to provide backup as the optimal control force of the controller network in the building structure at the current moment.

Some embodiments of the present disclosure have been experimented with many moments, and the value of the target function corresponding to $\Xi^{BO}$ predicted by the prediction module is, in the vast majority of cases, smaller than the standby value of the target function computed by the alternative scheme. As a result, although the alternative plan is executed synchronously, its calculated control force is rarely used.

Some embodiments of the present disclosure provide a method of determining an optimal control force of a building structure, including: constructing a nonconvex optimization problem of the target function and the constraint condition of the controller network in the building structure at the current moment based on the vibration control equations of the building structure, and then transforming the target function and the constraint condition of the controller network at the current moment into the mixed integer optimization problem by using the segmented McCormick inequality, and predicting the integer variable values in the current mixed integer optimization problem using the trained prediction module. If the integer variable values in the mixed integer optimization problem are determined, the mixed integer optimization problem becomes a convex optimization problem. That is, one or more embodiments of the present disclosure transform the nonconvex optimization problem, which is difficult to solve, into a convex optimization problem, which can be solved quickly. This transformation not only allows the solved control force to be optimal in comparison to the prior art, but also allows one or more embodiments of the present disclosure to solve for the optimal control force of the building structure in real time, i.e., there is no need to obtain only non-optimal control forces through table lookup and interpolation as in the prior art, so as to facilitates the subsequent continuous and effective vibration control of the building structure based on the optimal control force of the building structure solved in real time.

Some embodiments of the present disclosure provide a method for determining an optimal control force of a building structure, which is not only based on the external excitation, the parameters of the building structure itself, and the purpose of minimizing the amplitude of vibration of a floor of the building structure at the current moment, to construct the target function and the constraint condition of the controller network in the building structure at the current moment. The control objective is to calculate the current control force column vector of the building structure based on the total effect generated by the controllers of all floors in the building structure, which corresponds to the optimal control force of all controllers in the building structure. Using this column vectors of the control force for vibration control of the building structure at the current moment will not only result in a significant reduction of vibration amplitude of the building structure at the current moment, but will also have the positive effect of reducing the vibration of the building structure at some time in the future. This avoids the unfavorable situation where the solved control force minimizes the vibration amplitude of the building structure at the current moment, or a layer of the building structure, but increases the overall vibration amplitude of the building structure at a future time.

Some embodiments of the present disclosure provide a method for determining an optimal control force of a building structure, wherein "the control force is a dissipative force" is still included in the constraint condition of the target function. Thus, the control force solved based on the method does not inject energy into the building structure, which directly avoids the occurrence of instability of the building structure due to the injection of excessive energy into the building structure. Additionally, this method does not require a large amount of external energy, which effectively improves the subsequent vibration control.

In some embodiments of the present disclosure, in order to be able to solve the mixed integer optimization problem, the complex space corresponding to the feasible domain of the constraint condition is segmented and circled using the segmented McCormick inequality. During the segmented circling of the feasible domains, the fitting is continuously performed until that the circled $r^2$ feasible domains can be tightly centered around the objective surface when r is an integer not less than 4. As the value of r is larger, the feasible domains can be more tightly centered around the target surface, which leads to a more accurate optimal control force of the building structure at the current moment to be solved in the following. While there are $r^2$ feasible domains for solving the mixed integer optimization problem of solving the optimal control force of the building structure at the current moment, the minimum value of the target function corresponding to the optimal control force of the building structure at the current moment may only fall in one feasible domain. Therefore, once the integer variable values is determined, i.e., the integer number of the feasible domain in which the minimum value of the target function is located (subsequently referred to as the optimal integer number of the feasible domain) is accurately predicted, it is only necessary to find the minimum value of the target function and the corresponding control force within the range of this feasible domain. In this way, the mixed integer optimization problem, which is a nonconvex optimization problem, is transformed into a convex optimization problem that can be solved quickly. According to some embodiments of the present disclosure, the optimal integer number of the feasible domain, i.e., the integer variable value, is predicted by the trained prediction module. Compared with using a large DNN neural network, parallel DNN sub-neural networks are set up in the prediction module. This approach ensures a high accuracy of the prediction results while dramatically reducing the computational overhead and the consumption of memory resources, saving graphics memory, improving the prediction velocity, and making the training in the early stage more efficient. If the optimal integer number of the feasible domain is not predicted, and the BMIBNB solver is directly used to solve the mixed integer optimization problem, it not only has low solving efficiency and cannot meet the demand of real-time vibration control of the building structure using the optimal control force of the building structure in the current moment, but also is limited by computer storage space. Directly using the BMIBNB solver to solve the mixed integer optimization problem can be applied to the building structure with up to three degrees of freedom, resulting in poor generality and inability to solve the optimization problem in real time. For example, for a building structure with four degrees of freedom, more than 1 PT=1024 TB of computer storage is required, and the need for computational resources grows exponentially with increasing degrees of freedom.

According to some embodiments of the present disclosure, a method for determining an optimal control force of a building structure is provided, and in order to avoid a very rare case where the optimal integer number of the feasible domain predicted by the prediction module is wrong, which leads to a poor effect of the final solved control force, one or more embodiments of the present disclosure perform alternative schemes to play the role of a fallback at the same time. By using a fast standby solver and a semi-active control manner based on existing technology, the standby control matrix, standby state matrix, and a corresponding standby value of the target function of the controller network in the building structure at current and future moments may be solved. When the value of the target function corresponding to the optimal integer number of the feasible domain predicted by the prediction module is greater than the standby value of the target function computed by an alternative scheme, the optimal integer number of the feasible domain predicted by the prediction module is incorrect, and the control force computed in the alternative scheme is used to provide backup as the optimal control force of the controller network in the building structure at the current moment.

In some embodiments, the output of the prediction module further includes a probability of occurrence for each of the integer variable values; in response to an extreme difference of probabilities of occurrence being less than a preset probability threshold, the standby solver is enabled.

The probability of occurrence is an actual probability of occurrence corresponding to each of the integer variable values. It is understandable that the mixed integer optimization problem has $r^2$ feasible domains. The minimum value of the target function corresponding to the optimal control force of the building structure at the current moment may only fall within one feasible domain. If the mixed integer optimization problem is solved directly, the calculation process belongs to a nonconvex optimization problem, and the difficulty and cost of the calculation are relatively high. Therefore, the prediction module may be configured to first predict the integer number of the feasible domain where the minimum value of the target function is located, and then performing solving. The prediction module may have equivalent outputs in different forms. For example, assuming $r=4$, the output of the prediction module may be an integer, which is in the interval [1,16]; the output of the prediction module may also be a sixteen-bit binary number, in which only one bit is 1, indicating that the minimum value of the target function predicted by the prediction module falls within this feasible domain. The output of the prediction module may also be sixteen probability values, and a sum of the sixteen probability values is 1.

The preset probability threshold is positively correlated to a standard deviation of a plurality of probabilities of occurrence output by the current prediction module. For example, the larger the standard deviation of the plurality of probabilities of occurrence output by the prediction module, the larger the preset probability threshold. The preset probability threshold changes dynamically as the output of the prediction module changes, which can be adapted to different output scenarios. The larger the standard deviation of the plurality of probabilities of occurrence means that there may be an integer variable value with a very small probability of occurrence, and at this time, appropriately increasing the preset probability threshold can avoid using the integer variable value with the very small probability of occurrence in the calculation.

In some embodiments, the processor records each probability of occurrence output by the prediction module and compute an extreme difference of the probabilities of occurrence, and determines to enable the standby solver when the extreme difference of the probabilities of occurrence is less than the preset probability threshold.

The extreme difference of the probabilities of occurrence refers to a difference between a maximum probability of occurrence and a minimum probability of occurrence among the plurality of probabilities of occurrence output by the prediction module.

In some embodiments of the present disclosure, by determining that the extreme difference of the probabilities of occurrence is less than the preset probability threshold, the standby solver is enabled to compute the standby parameter, thereby achieving the effect of reasonably allocating computational resources, avoiding unnecessary computational overhead, and improving overall efficiency.

In some embodiments, in response to the third difference being greater than a second preset threshold, the processor enables the standby solver.

The third difference refers to a difference between a control force vector of a future moment in the optimal control force matrix determined at the current moment and a control force vector of the current or future moment in a predicted control force matrix determined at a plurality of different future moments.

The plurality of different future moments are determined based on a moment corresponding to each column vector in the optimal control force matrix at the current moment. For example, the current moment is 18:00:15.123, and one optimal control force matrix is obtained every 0.02 s. Each optimal control force matrix includes 21 column vectors. In the adjacent column vectors of the same optimal control force matrix, the time dimension increases by 0.02 s from left to right. In one optimal control force matrix, the last column vector is the optimal control force column vector corresponding to the future moment 0.4 S from the current moment. Assuming that the future moment is 0.1 s later, the predicted control force vectors determined at a plurality of different future moments may be the 6th control force column vector in the predicted control force matrix at the current moment, or the 4th control force column vector in the predicted control force matrix 0.04 s from the current moment, or the 1st control force column vector in the predicted control force matrix 0.1 s from the current moment.

More description of determining the predicted control force matrix of a plurality of different future moments can be found in the corresponding description in FIG. 8.

In some embodiments of the present disclosure, the processor compares a plurality of control force vectors at the same moment in the control force matrices determined at different moments, and if the difference is greater than the second preset threshold, enable the standby solver.

The second preset threshold may be set empirically.

In some embodiments of the present disclosure, the second preset threshold is related to differences between a plurality of different future moments and the current moment. For example, the greater the mean value of the differences between the plurality of different future moments and the current moment, the greater the second preset threshold.

When the mean value of the differences between the plurality of different future moments and the current moment is larger, it indicates that the plurality of different future moments are farther away from the current moment, at this time, the accuracy of the predicted control force matrix may be reduced, so it is necessary to increase the second preset threshold to avoid frequently enabling the standby solver.

In some embodiments of the present disclosure, by calculating the third difference, the difference between the optimal control force matrix determined at the current moment and the predicted control force matrix determined at a plurality of different future moments can be evaluated, facilitating the use of a more reasonable frequency to enable the standby solver.

Embodiment 2

Figure 5:
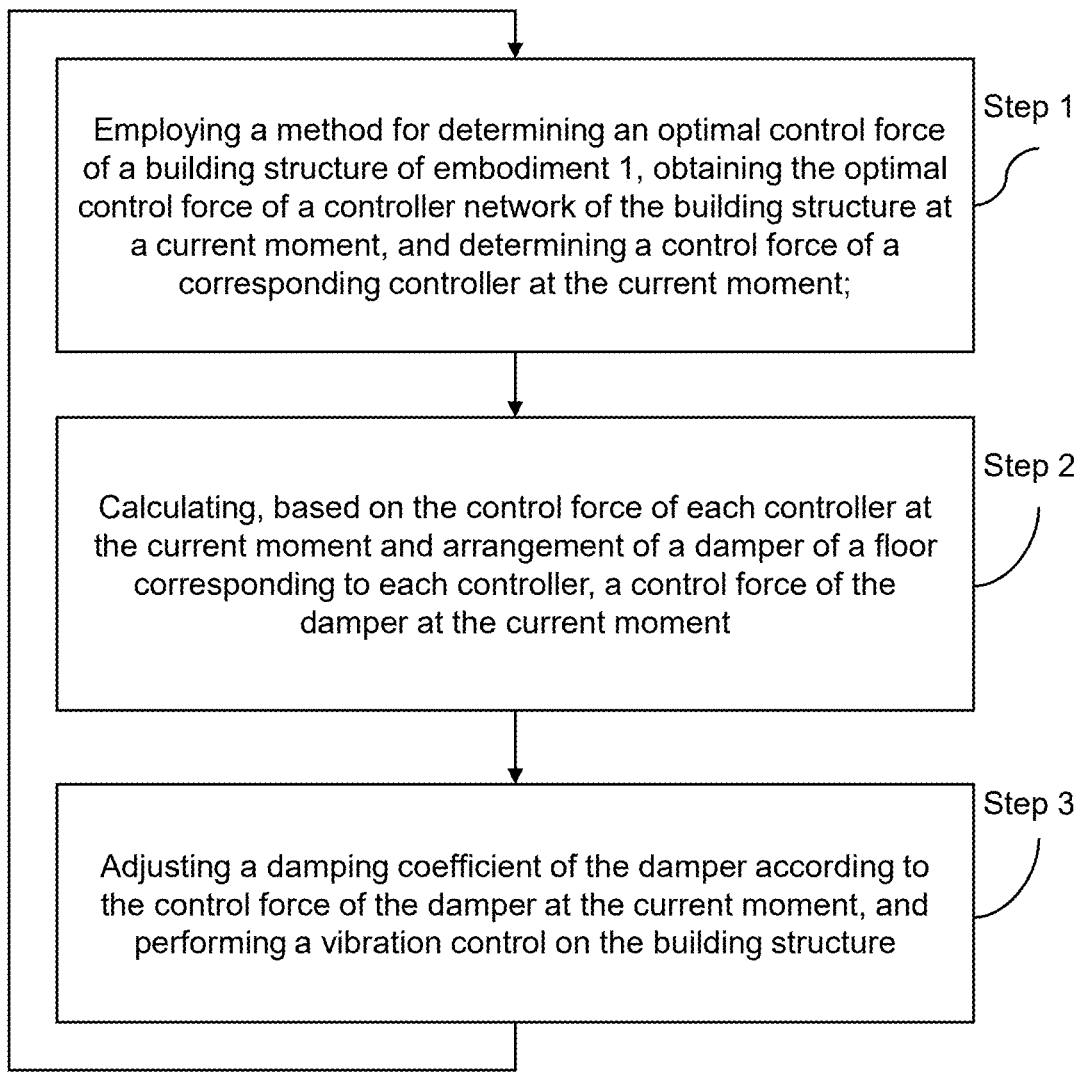
FIG. 5 is a flowchart of a method for vibration control of a building structure according to some embodiments of the present disclosure.

As shown in FIG. 5, one of the embodiments of the present disclosure further provides a method for vibration control of a building structure, including:

Step 1, employing the method for determining an optimal control force of a building structure of embodiment 1, obtaining the optimal control force of the controller network of the building structure at the current moment, and determining a control force of a corresponding controller at the current moment;

Step 2, calculating, based on the control force of each controller in the building structure at the current moment and arrangement of a damper of a floor corresponding to each controller in the building structure, a control force of the damper at the current moment; and Step 3, adjusting a damping coefficient of the damper according to the control force of the damper at the current moment, and performing a vibration control on the building structure.

In some embodiments, steps 1 to 3 are repeated, and after continuously obtaining a new optimal control force of the controller network in a new building structure at the current moment, continuous vibration control is performed on the building structure.

Steps 2 and 3 may both be realized based on computational manners already available in the art, and are not described in detail herein.

In Step 2, the process of calculating, based on the control force of each controller in the building structure at the current moment and the arrangement of the corresponding floor dampers, the control force of damper in the building structure at the current moment is a prior art (Yu T, Johnson E A, Brewick P T, et al. Modeling and model updating of a full-scale experimental base-isolated building [J]. Engineering Structures, 2023, 280:114216-. DOI: 10.1016/j.engstruct.2022.114216.).

In Step 3, the process of adjusting the damping coefficient of the damper corresponding to the control force of the damper in the building structure at the current moment is a prior art (Dyke S J, Spencer B F, Sain M K, et al. Seismic Response Reduction Using Magnetorheological Dampers [J]. IFAC Proceedings Volumes, 1996, 29 (1): 5530-5535.).

By means of numerical simulation, the method for vibration control of a building structure provided according to some embodiments of the present disclosure is compared with the semi-active control manner proposed by Scruggs J T et al. of the prior art for the vibration control effect under the same excitation of the same building structure (i.e., both the dampers within the building structure and the arrangement of the dampers are the same), and the comparison includes:

when the type of the external excitation is earthquake, taking a five-degree-of-freedom frame building structure as an example, which is controlled by two dampers located on the first and second floors, with a first-order natural frequency of 1 Hz and a damping ratio of the first five vibration modes between 2% and 5%, ten different earthquake scenarios were simulated. Ten vibration control experiments were conducted in total, with the control object being to reduce the absolute acceleration of each floor plates of the building structure.

Figure 6A:
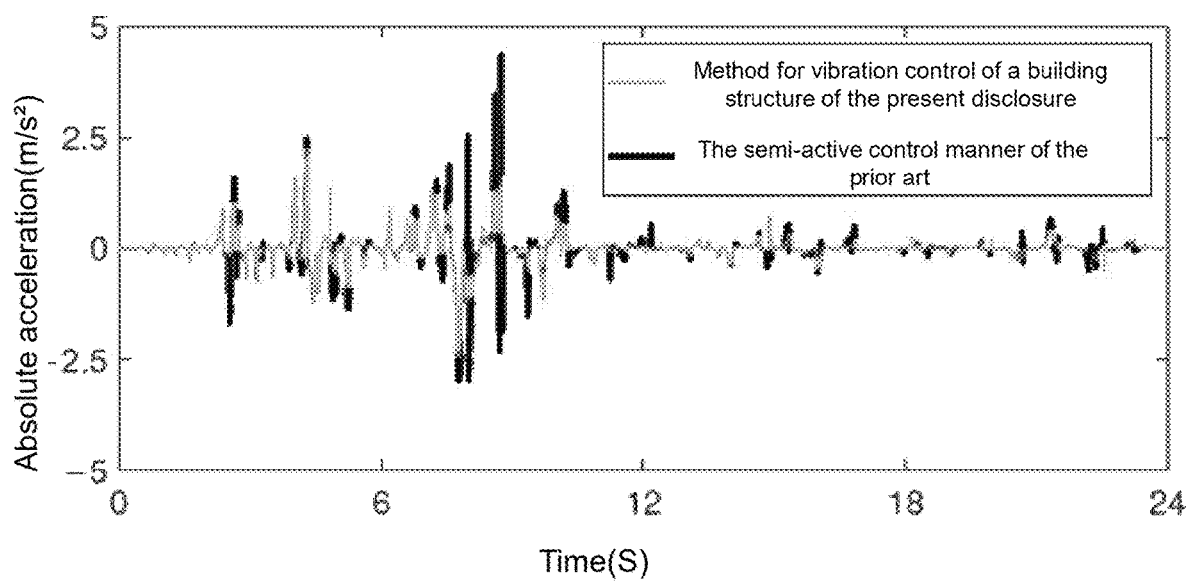
FIG. 6a is a comparative diagram of an absolute acceleration response of a first floor plate of a building structure according to some embodiments of the present disclosure.

As shown in FIG. 6a, which is a comparative diagram of an absolute acceleration response of a first floor plate of a building structure under the method for vibration control according to some embodiments of the present disclosure and the prior art. The horizontal axis represents time, the vertical axis represents the absolute acceleration of the first floor plate, wherein the reverse acceleration is negative, the green curve represents the absolute acceleration of the first floor plate under the method for vibration control of the building structure according to one or more embodiments of the present disclosure, and the blue curve represents the absolute acceleration of the first floor plate under the prior art.

Figure 6B:
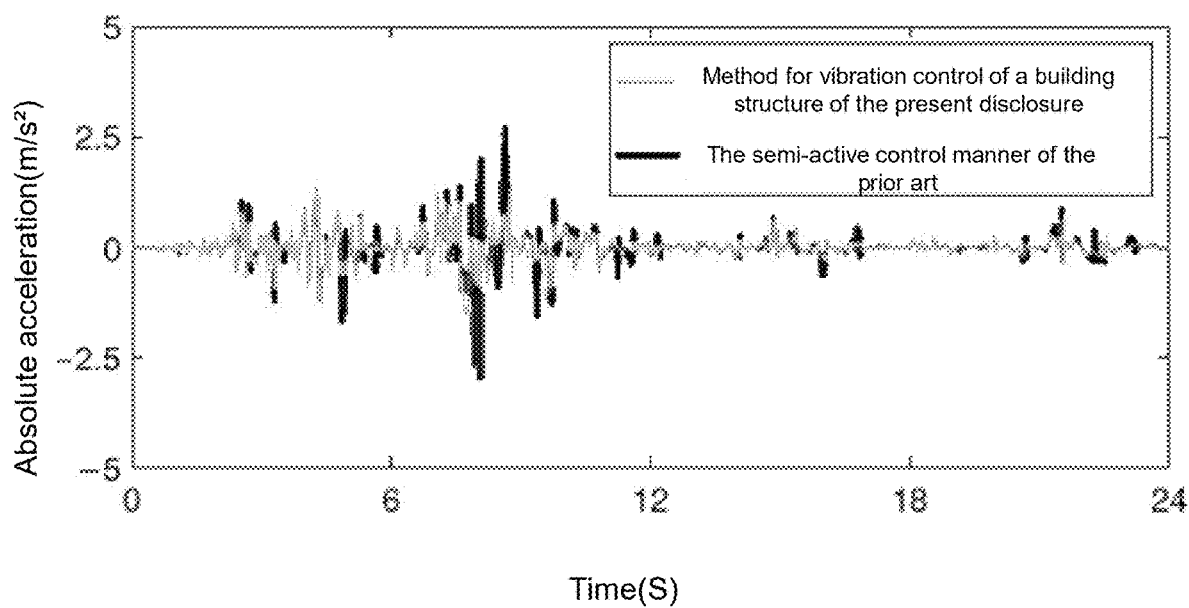
FIG. 6b is a comparative diagram of an absolute acceleration response of a second floor plate of a building structure according to some embodiments of the present disclosure.

Similarly, as shown in FIG. 6b, which is a comparative diagram of an absolute acceleration response of a second floor plate of a building structure under the method for vibration control according to some embodiments of the present disclosure and the prior art. The green curve represents the absolute acceleration of the second floor plate under the method for vibration control of the building structure according to one or more embodiments of the present disclosure, and the blue curve represents the absolute acceleration of the second floor plate under the prior art.

It can be seen that the peak of absolute acceleration of each floor plate of the building structure under the method for vibration control of one or more embodiments of the present disclosure is significantly smaller than the peak of absolute acceleration of each floor plate of the same floor at the same moment under the prior art. Additionally, the magnitude of the absolute acceleration of each floor plate of the building structure changing over time under the method for vibration control of one or more embodiments of the present disclosure is also significantly smaller than the magnitude of the absolute acceleration of each floor plate of the same floor at the same moment changing over time under the prior art.

The building structure under the method for vibration control of one or more embodiments of the present disclosure achieves a steady state, i.e., the absolute acceleration of each floor plate stabilizes essentially around 0, and takes less time than the prior art. The magnitude of change in the absolute acceleration of each floor plate of the building structure under the method for vibration control of one or more embodiments of the present disclosure is overall smaller, smoother, and closer to 0, and it takes less time for the building structure to reach the steady state. The vibration control effect of the method for vibration control of one or more embodiments of the present disclosure is improved in the range of 20% to 50% as compared to the prior art.

Embodiment 3

According to some embodiments of the present disclosure, one or more embodiments of the present disclosure further provide a system for vibration control of a building structure including:

sensors, dampers, a processing module, and a prediction module.

The building structure is arranged within the sensors and the dampers, all of the dampers within the building structure constitute a controller network in the building structure.

The processing module is configured to receive state data of the building structure collected by the sensors, obtain a mixed integer optimization problem of the controller network in the building structure after computation and processing based on floor acceleration data collected by the sensors, and feed the mixed integer optimization problem into the prediction module.

The prediction module is configured to predict an integer variable value in the mixed integer optimization problem and feed the integer variable value back to the processing module. The processing module is configured to obtain an optimal control force of the controller network in the building structure at the current moment by calculating based on the integer variable value fed back from the prediction module, and perform a vibration control on the building structure by adjusting a damping coefficient of a corresponding damper based on the optimal control force at the current moment.

The respective modules, sensors, and dampers are programmed or configured to perform the method of determining an optimal control force of a building structure as described in Embodiment 1, or the method for vibration control of a building structure as described in Embodiment 2.

The dampers in the building structure may be of different types.

In this embodiment, the damper in the building structure is a self-powered damper.

Some embodiments of the present disclosure further provide a computer-readable storage medium storing a computer program that is programmed or configured to perform the method for determining an optimal control force of a building structure as described in Embodiment 1 or the method for vibration control of a building structure as described in Embodiment 2.

Some embodiments of the present disclosure further provide a computer program product including a computer program/instruction, when the computer program/instruction executed by a processor, the method for determining an optimal control force of the building structure as described in Embodiment 1 or the method for vibration control of a building structure as described in Embodiment 2 is implemented.

In summary, a method and a system for vibration control of the building structure provided in one of the embodiments of the present disclosure not only do not need to consume a large amount of external energy to directly provide the control force but also avoids the problem of the building structure instability due to the injection of too much energy into the building structure. Furthermore, compared to the semi-active control manner of the prior art, the present vibration control method can optimally control the vibration of the building structure based on the optimal control force at the current moment determined in real time and automatically. This reduces the degree of vibration of the building structure over a future time period overall, improves the vibration control effect as a whole, shortens the time for the building structure to reach a steady state, and further improves the safety coefficient and risk-resistant ability of the building structure.

Embodiment 4

One of the embodiments of the present disclosure further provides a method of selecting and arranging a damper in a building structure, including:

Step 01, determining a damper arrangement scheme, wherein the damper arrangement scheme including selection of a damper type and determination of an arrangement position;

Step 02, simulating different types or manners of external excitations based on the damper arrangement scheme in the building structure at a current moment, and adopting the method for determining an optimal control force of a building structure of embodiment 1 to obtain the optimal control force of the controller network in the building structure at the current moment under the different types or manners of external excitations; and Step 03, if the current damper arrangement scheme fails to satisfy an optimal control force requirement of the controller network in the building structure at the current moment under the different types or manners of external excitations, adjusting the damper arrangement scheme and going back to the step 02 until the current damper arrangement scheme meets the optimal control force requirement of the controller network in the building structure at the current moment under the different types or manners of external excitations, then designating the current damper arrangement scheme as a final arrangement scheme of the dampers in the building structure.

The skilled person utilizes the method of selecting and arranging a damper in a building structure provided in one of the embodiments of the present disclosure to optimize the selection and arrangement of dampers in the building structure. The method not only minimizes the overall cost of the dampers in the building structure, but also ensures that the vibration control of the building structure carried out through the controller network constituted by the current dampers has a better control effect.

Technology, shapes, and construction parts not described in detail in one or more embodiments of the present disclosure are known in the art.

The above is only a preferred embodiment of one or more embodiments of the creation of the present disclosure, and is not intended to limit the creation of one or more embodiments of the creation of the present disclosure, and any modifications made in the spirit of the creation of one or more embodiments of the creation of the present disclosure and the principles of the creation thereof, any modifications, equivalent substitutions and improvements made within the spirit and principles of one or more embodiments of the present disclosure shall be included in the scope of protection of one or more embodiments of the present disclosure.

FIG. 8 is an exemplary flowchart for determining a predictive control force matrix according to some embodiments of the present disclosure. As shown in FIG. 8, process 800 includes the following steps. In some embodiments, process 800 is executed by a processor.

In some embodiments, in response to receiving a predicted activation signal from a sensing module, the processor determine a probability distribution of spectrum characteristics of a predicted external excitation for the future moment based on spectrum characteristics of historical external excitations and environmental data at a plurality of historical moment; determine a predicted control force matrix for the future moment based on the probability distribution of spectrum characteristics of the predicted external excitation; and in response to a first difference satisfying a first preset condition, pre-regulate based on the predicted control force matrix; wherein the first difference is a difference between the control force vector of the future moment in the predicted control force matrix and a control force vector of the future moment in the optimal control force matrix.

Step 810, in response to receiving a prediction start signal from the sensing module, determine the probability distribution of the spectrum characteristics of the predicted external excitation at a future moment according to the spectrum characteristics of the historical external excitation and the environmental data at a plurality of historical moments.

The sensing module refers to a device and/or a group of devices for obtaining environmental information from the outside world. In some embodiments, the sensing module may include a plurality of microwave sensors disposed on an outer wall of the building, a plurality of wind direction and wind speed sensors, and/or a plurality of seismic sensors disposed on a surface around the building.

In some embodiments, the sensing module may be configured to: collect environmental data and the size of the external excitation in real time, and send the prediction start signal to the processor when a preset trigger condition is met.

In some embodiments, the preset trigger condition may be that N consecutive fluctuation ratios all exceed a preset fluctuation threshold. N and the preset fluctuation threshold may be set by a person skilled in the art based on experience.

In some embodiments, N may be related to the size of the external excitation. Specifically, the larger the size of the external excitation, the smaller N.

The fluctuation ratio refers to a ratio of a difference between the environmental data acquired by the sensing module at two adjacent sampling time points to the environmental data at an earlier sampling time point of the two adjacent sampling time points.

The difference between the environmental data of two adjacent sampling time points refers to a distance between the environmental data of the two adjacent sampling time points, for example, the Euclidean distance of the wind speed and wind direction at the two adjacent sampling time points, a difference in earthquake magnitude of the two adjacent sampling time points, a difference in vehicle flow at the two adjacent sampling time points, etc.

In some embodiments of the present disclosure, the size of N is dynamically adjusted according to the size of the external excitation, so that when the change of the external excitation is larger and more drastic, the sending condition of the prediction start signal may be reduced, and the vibration of the building may be pre-regulated in time. The historical external excitation refers to an external excitation acting on the building structure at a historical moment. The historical moment refers to a moment within a time period before the current moment. In some embodiments, a plurality of historical moments may include a plurality of consecutive moments within a period of time before the current moment. For more information about external excitation, please refer to the relevant description in embodiment 1.

The environmental data refers to data related to the environment in which the building structure is situated in the presence of the external excitation. In some embodiments of the present disclosure, the environmental data include meteorological data, geological data, traffic data, or the like. For example, when the type of the external excitation is a strong wind, the environmental data may be wind force and wind direction data; when the type of the external excitation is an earthquake, the environmental data may be a distance between the building structure and the source of the earthquake; and when the type of the external excitation is a social factor such as transportation, the environmental data may be distribution data of transportation facilities, such as subways, elevated roads, high-velocity railways, etc.

The probability distribution of the spectrum characteristics of the predicted external excitation refers to a distribution of the probability of occurrence of the spectrum characteristics of the predicted external excitation at different future moments. In some embodiments, the probability distribution of the spectrum characteristics of the predicted external excitation may include the probability of occurrence of the spectrum characteristics of the predicted external excitation at different future moments. In some embodiments, the probability distribution of the spectrum characteristics of the predicted external excitation may be expressed in the form of a vector, for example, (the probability that the spectrum characteristics of the predicted external excitation at a future moment is X1), (the probability that the spectrum characteristics of the predicted external excitation at a future moment is X2, . . . ).

The spectrum characteristics of the predicted external excitation refer to an estimated spectrum characteristics of the external excitation at a future moment. In some embodiments, the spectrum characteristics of the predicted external excitation may include the spectrum characteristics corresponding to the upcoming strong wind, earthquake, etc. In some embodiments, the processor may determine the probability distribution of the spectrum characteristics of the predicted external excitation in a variety of ways. For example, the processor may perform a first clustering based on the first clustering index to obtain a plurality of first clusters, select the first clustering cluster containing the target vector, and record it as the first target clustering cluster; based on a second clustering index, perform a second clustering on the first target clustering cluster to obtain a plurality of second clustering clusters; for each second clustering cluster, take the weighted sum of all the second clustering vectors therein as the spectrum characteristics corresponding to the second clustering cluster; take a ratio of the count of second clustering vectors in the second clustering cluster to the count of first clustering vectors in the first target clustering cluster as the probability of occurrence of the spectrum characteristics corresponding to the second clustering cluster; based on the spectrum characteristics and corresponding probabilities of occurrence of each second clustering cluster in the first target clustering cluster, determine the probability distribution of spectrum characteristics of the predicted external excitation at the final future moment.

The first clustering index refers to spectrum characteristics and environmental data of historical external excitation at a plurality of historical moments. The target vector may include the spectrum characteristics and environmental data of historical external excitation at the plurality of historical moments corresponding to the current moment. The target vector may be constructed based on the spectrum characteristics and environmental data of historical external excitation at the plurality of historical moments corresponding to the current moment. The first clustering vector may include the spectrum characteristics and environmental data of historical external excitation at the plurality of historical moments and the corresponding spectrum characteristics of predicted external excitation at future moments. The first clustering vector may be constructed based on historical data such as the spectrum characteristics of historical external excitation at the plurality of consecutive moments in the historical data, the historical environmental data, and the spectrum characteristics of actual external stimuli corresponding to the spectrum characteristics of historical external excitation at a plurality of consecutive moments in the historical data after a subsequent time period.

The second clustering index refers to spectrum characteristics of external excitation. The second clustering vector may include the spectrum characteristics of predicted external excitation at future moments. The second clustering vector may be constructed based on the spectrum characteristics of predicted external excitation at future moments in each first clustering vector in the first target cluster.

In some embodiments, the processor may also determine the probability distribution of the spectrum characteristics of predicted external excitation at future moments based on the spectrum characteristics and environmental data of historical external excitation at the plurality of historical moments through an excitation prediction model. For more descriptions, see FIG. 9 and its related description.

Step 820, based on the probability distribution of the spectrum characteristics the predicted external excitation, determining the predicted control force matrix at the future moment.

The predicted control force matrix includes predicted control force vectors for future moments in vibration control of the building structure.

In some embodiments of the present disclosure, the processor determines a manner of predicting external excitations at future moments based on the spectrum characteristics of the predicted external excitation having the highest probability of occurrence in the probability distribution of the spectrum characteristics of the predicted external excitation at the future moment, and determine a predicted control force matrix at future moments through a mathematical model and an algorithm based on the manner for predicting external excitations at future moments. The process of determining the predicted control force matrix for the future moment is similar to the process of determining the optimal control force matrix, as described more in Embodiment 1 and its related description.

Step 830, in response to the first difference satisfying the first preset condition, performing a pre control based on a predictive control force matrix.

The first difference is the difference between the control force vector at future moments in the predicted control force matrix and the control force vector at future moments in the optimal control force matrix.

In some embodiments, the processor calculates a vector distance between the control force vector at future moments in the predicted control force matrix and the control force vector at future moments in the optimal control force matrix as the first difference.

The first preset condition means that the vector distance between the control force vector at the future moment in the predicted control force matrix and the control force vector at the future moment in the optimal control force matrix is greater than a preset change threshold. The preset change threshold is set empirically.

In some embodiments, the preset change threshold is related to a frequency at which the external excitation impacts the building structure. For example, the higher the frequency of vibration caused by the external excitation on the building structure, the lower the preset change threshold. The higher the frequency of the external excitation affecting the building structure, the greater the impact of the change in the intensity of the external excitation on the vibration of the building structure, and at this time the preset change threshold is appropriately lowered, so that the optimal control force matrix can be timely adjusted.

It can be understood that the optimal control force matrix is the optimal solution obtained when the probability distribution of the spectrum characteristics of the predicted external excitation is not considered. In some embodiments, when the difference between the control force vector of the future moment in the predicted optimal control force matrix and the control force vector of the future moment in the optimal control force matrix is greater than the preset change threshold, indicating that the control force vector of the future moment in the optimal control force matrix at the current moment is inaccurate, the processor may regulate the optimal control force matrix of the controller network at the current moment based on the predicted control force matrix.

In some embodiments of the present disclosure, the probability distribution of the spectrum characteristics of the predicted external excitation at the future moment is predicted, and based on the probability distribution, the spectrum characteristics of the predicted external excitation with the highest probability of occurrence at the future moment are determined, thereby determining the predicted control force matrix at the future moment, and based on the difference between the predicted control force matrix at the future moment and the optimal control force matrix, it is determined whether to adopt the predicted control force matrix for regulation, thereby avoiding unnecessary regulation while achieving pre-regulation, saving regulation costs, and improving regulation efficiency.

In some embodiments, in response to the second difference being less than the first preset threshold, the processor uses the optimal control force vector for the future moment in the optimal control force matrix as the control force vector to be used for regulation at the future moment.

The second difference is a difference between the spectrum characteristics of the predicted external excitation with the highest probability of occurrence in the probability distribution of the spectrum characteristics of the predicted external excitation and the spectrum characteristics of the current external excitation, wherein the difference may be the Euclidean distance, cosine distance, etc., between the spectrum characteristics of the predicted external excitation with the highest probability of occurrence in the probability distribution of the spectrum characteristics of the predicted external excitation and the spectrum characteristics of the current external excitation.

The first preset threshold is set empirically. In some embodiments, the first preset threshold is related to spectrum characteristics of the predicted external excitation with the highest probability of occurrence in the probability distribution of the spectrum characteristics of the predicted external excitation. For example, the greater the predicted external excitation at the future moment, the smaller the first preset threshold. The higher the predicted external excitation, the greater and more intense the change in the external excitation at this time, and at this time the first preset threshold is appropriately lowered, so that it can be responsive to the impact of the change in the external excitation on the building structure.

The control force vector is a vector used to represent the control force exerted by the individual controllers at a given moment.

In some embodiments, when the second difference is less than the first preset threshold, the processor determines that the predicted control force vector is sufficiently close to the optimal control force vector such that it can be directly regulated using the optimal control force vector in the optimal control force matrix.

In some embodiments of the present disclosure, when the change in the external excitation is not drastic or there is no obvious fluctuation, the optimal control force of the future moment in the optimal control force matrix is used as the control force utilized for regulation in subsequent future moments, improving the efficiency of the optimal control force calculation by eliminating the need for additional computation.

In some embodiments of the present disclosure, by using the spectrum characteristics and environmental data of historical external excitation at a plurality of historical moments, the probability distribution of the spectrum characteristics of the predicted external excitation at future moments can be predicted and responded to in advance, and based on the probability distribution, the optimal control force matrix can be pre-regulated to avoid the problem of untimely real-time regulation, reduce control lag, and optimize the control effect.

Figure 9:
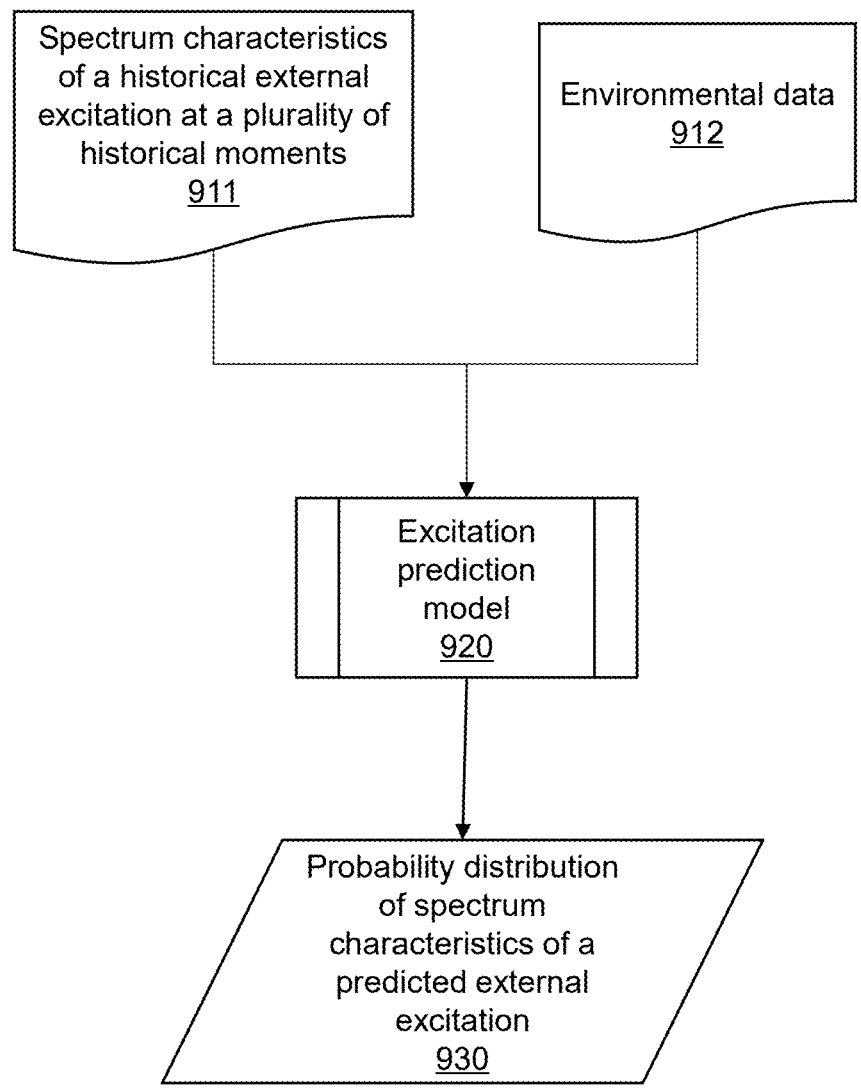
FIG. 9 is an exemplary schematic diagram of an excitation prediction model according to some embodiments of the present disclosure.

FIG. 9 is an exemplary schematic diagram of an excitation prediction model according to some embodiments of the present disclosure. As shown in FIG. 9, in some embodiments, the processor determines a probability distribution 930 of spectrum characteristics of a predicted external excitation based on and environmental data 912 through an excitation prediction model 920.

The excitation prediction model 920 is a model used to predict the external excitation at future moments. In some embodiments, the excitation prediction model 920 is a machine learning model, e.g., deep neural networks (DNN), or the like.

In some embodiments, the inputs of the excitation prediction model 920 include the spectrum characteristics 911 of the historical external excitation at the plurality of historical moments, the environmental data 912, and the outputs of the excitation prediction model 920 include the probability distribution 930 of spectrum characteristics of the predicted external excitation.

See FIG. 8 and its related descriptions for a description of the spectrum characteristics 911 of the historical external excitation at the plurality of historical moments, the environmental data 912, and the probability distribution 930 of spectrum characteristics of the predicted external excitation. In some embodiments, the environmental data 912 is obtained through third-party information sources and/or data sources. For example, the environmental data 912 is accessed via an open data platform of a weather bureau, a seismic bureau, a transportation bureau, or the like.

In some embodiments, the excitation prediction model 920 is obtained by training based on the first training sample and the first label. The first training sample includes spectrum characteristics of sample external excitation and sample environmental data at a plurality of first historical moments in the historical data, and the first label is spectrum characteristics of actual external excitation at a second historical moment in the historical data. The second historical moment is later than the plurality of first historical moments.

In some embodiments, the processor inputs one or more first training samples with labels into an initial excitation prediction model, constructs a loss function from the first labels and the output of the initial excitation prediction model, and iteratively updates the parameters of the initial excitation prediction model based on the loss function by gradient descent or other manners. When preset conditions are met, the model training is completed and a trained excitation prediction model is obtained. The preset conditions include that the loss function converges, the count of iterations reaches a threshold, or the like.

In some embodiments of the present disclosure, by using a trained excitation prediction model, the predicted external excitation at the future moments can be predicted relatively quickly and accurately, allowing for subsequent vibration control of the building structure to be performed in a way that enables more accurate decisions to be made.

Figure 10:
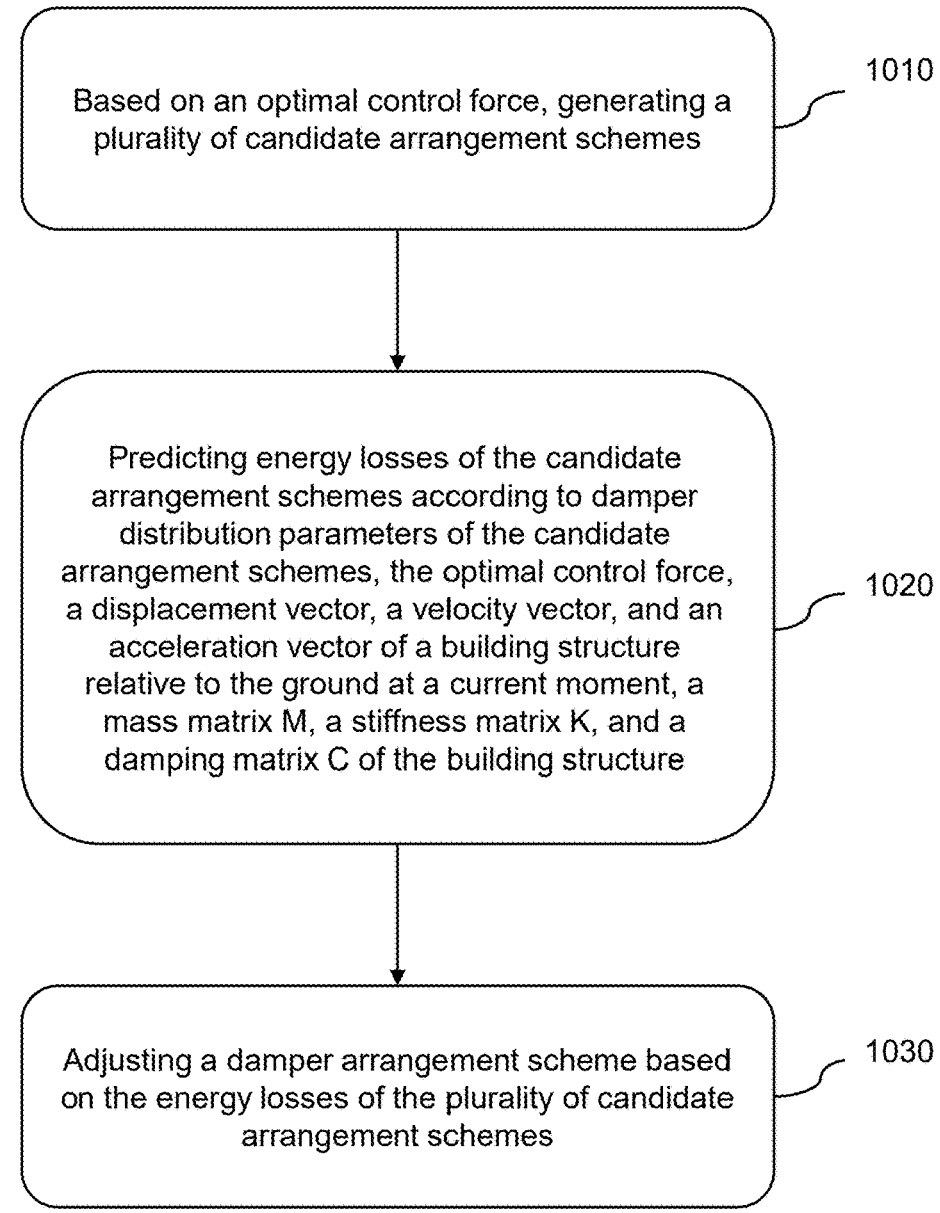
FIG. 10 is an exemplary flowchart for adjusting a damper arrangement scheme according to some embodiments of the present disclosure.

FIG. 10 is an exemplary flowchart for adjusting a damper arrangement scheme according to some embodiments of the present disclosure. As shown in FIG. 10, process 1000 includes the following steps. In some embodiments, process 1000 is executed by a processor.

In some embodiments, adjusting a damper arrangement scheme includes: generating a plurality of candidate arrangement schemes based on an optimal control force; predicting energy losses of the candidate arrangement schemes according to the damper distribution parameters of the candidate arrangement schemes, the optimal control force, a displacement vector, a velocity vector, and an acceleration vector of the building structure relative to the ground at a current moment, a mass matrix M, a stiffness matrix K, and a damping matrix C of the building structure; and adjusting the damper arrangement scheme based on the energy losses of the plurality of candidate arrangement schemes.

Step 1010, based on the optimal control force, generating a plurality of candidate arrangement schemes.

The candidate arrangement schemes refer to a plurality of possible ways to arrange the dampers in the design of the building structure. In some embodiments, a candidate arrangement scheme includes information such as the count of dampers, positions, types, and connection manners of dampers.

In some embodiments, the processor randomly generates the plurality of candidate damper arrangement schemes subject to satisfying the optimal control force.

Step 1020, predicting the energy losses of the candidate arrangement schemes according to the damper distribution parameters of the candidate arrangement schemes, the optimal control force, the displacement vector, the velocity vector, and the acceleration vector of the building structure relative to the ground at the current moment, the mass matrix M, the stiffness matrix K, and the damping matrix C of the building structure.

The damper distribution parameter is a parameter related to the distribution of dampers in each floor of a building structure. For example, the damper distribution parameter includes the geographic coordinates of the position of each damper and the number of floors in the building.

Related descriptions of displacement vectors, velocity vectors, and acceleration vectors of the building structure with respect to the ground at the current moment, the mass matrix M, the stiffness matrix K, and the damping matrix C of the building structure are described in the vibration control operational equations for the building structure in Embodiment 1 and its related description.

The energy loss is the electrical energy consumed to regulate the operating state of each damper to maintain optimal control forces.

In some embodiments of the present disclosure, the processor predicts the energy loss of the candidate arrangement scheme in various ways. For example, the processor constructs a damper distribution map based on the damper distribution parameters.

The damper distribution map is an undirected graph whose nodes are the dampers, and an edge exists between the nodes corresponding to the two dampers when the two dampers are on the same floor or on the wall with the same position in different floors. The nodes are characterized by a displacement vector, a velocity vector, and an acceleration vector of the building structure at the point position with respect to the ground at the current moment; and the edge is characterized by a straight line distance between the two nodes.

Figure 11:
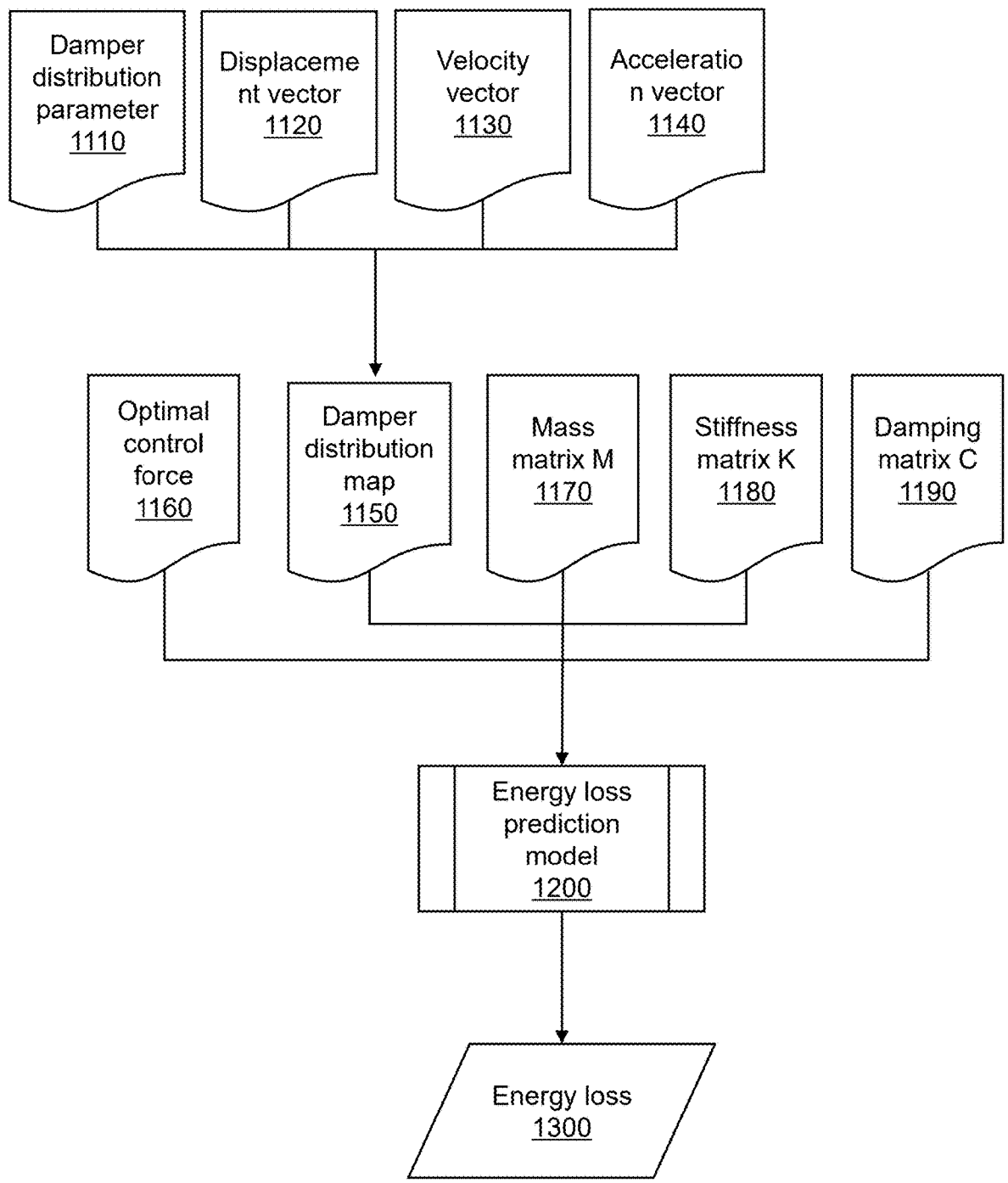
FIG. 11 is an exemplary schematic diagram of an energy loss prediction model according to some embodiments of the present disclosure.

The processor may determine the energy loss of the arrangement scheme by means of an energy loss prediction model based on the damper distribution map, the optimal control forces, the mass matrix M, the stiffness matrix K, and the damping matrix C of the building structure, and more details can be referenced in the description of FIG. 11.

Step 1030, adjusting the damper arrangement scheme based on the energy losses of the plurality of candidate arrangement schemes.

The damper arrangement scheme refers to a specific scheme in the design of a building structure with respect to the count of the dampers, the positions, types, connection manners and control strategies of the dampers.

In some embodiments, the processor selects, based on the energy loss of the plurality of candidate arrangement schemes, the candidate arrangement scheme with the smallest energy loss as the target damper arrangement scheme and adjusts the current distribution of the dampers.

In some embodiments of the present disclosure, the vibration of the structure is ensured to be effectively controlled by generating candidate arrangement schemes based on the optimal control forces for each scheme. Then, based on the dynamics parameters of the structure and the current state parameters, the generated candidate schemes are better adapted to the actual needs of the structure and improve the control effect. Finally, by predicting the energy loss of each candidate scheme, the one with the smallest energy loss is selected to reduce unnecessary energy loss and prolong the service life of the damper.

FIG. 11 is an exemplary schematic diagram of an energy loss prediction model according to some embodiments of the present disclosure. As shown in FIG. 11, in some embodiments, the processor determines an energy loss 1300 based on a damper distribution parameter 1110 of an arrangement scheme, an optimal control force 1160, a displacement vector 1120 of a building structure (the displacement vector of the building structure with respect to the ground at the current moment), a velocity vector 1130, and an acceleration vector 1140, a mass matrix M 1170, a stiffness matrix K 1180, and a damping matrix C 1190 using an energy loss prediction model 1200.

The energy loss prediction model 1200 is a model used to predict the energy loss of the candidate arrangement scheme. In some embodiments, the energy loss prediction model 1200 is a machine learning model, such as a Graph Neural Network (GNN), for example.

In some embodiments, inputs to the energy loss prediction model 1200 include a damper distribution map 1150, the optimal control force 1160, the mass matrix M 1170, the stiffness matrix K 1180, and the damping matrix C1190. The damper distribution May 1150 is constructed from the damper distribution parameter 1110, the displacement vector 1120, the velocity vector 1130, and the acceleration vector 1140. The output of the energy loss prediction model 1200 is the energy loss 1300 at various nodes in the damper distribution map.

For a description of the damper distribution map 1150 and the energy loss 1300, see FIG. 10 and its associated description. For an illustration of the optimal control force 1160, the mass matrix M 1170, the stiffness matrix K 1180, and the damping matrix C 1190, see Embodiment 1 and its related description.

The damper distribution parameter 1110, the optimal control force 1160, the mass matrix M 1170, the stiffness matrix K 1180, and the damping matrix C 1190 are obtained through third-party information sources and/or data, such as architectural design documents, that are pre-acquired or preset; the displacement vector 1120, the velocity vector 1130, and the acceleration vector 1140 are acquired in real time via sensors.

In some embodiments of the present disclosure, the energy loss prediction model 1200 is obtained by training based on second training samples and a second label. The second training sample includes a sample damper distribution map constructed from a damper arrangement scheme at a plurality of moments when the external excitation has caused an effect in the historical data, and a sample mass matrix M, a sample stiffness matrix K and a sample damping matrix C of a corresponding building structure. The second label may be an energy loss at each node after the second training sample is actually regulated in the historical data.

The training of the energy loss prediction model 1200 is similar to the training of the excitation prediction model 920, and more can be found in FIG. 9 and its related descriptions.

In some embodiments of the present disclosure, through the use of a trained energy loss prediction model, it is possible to more efficiently and conveniently, accurately and comprehensively predict the energy loss, which is conducive to the development of a more reasonable damper arrangement scheme, and improve the accuracy and timeliness of vibration control for the building structure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly

What is claimed is:

1. A method for vibration control of a building structure, comprising:
    step 1, employing a method for determining an optimal control force of the building structure, obtaining an optimal control force of a controller network of the building structure at a current moment, and determining a control force of a corresponding controller at the current moment; wherein the method for determining the optimal control force of the building structure, comprising:
    S1, constructing a vibration control equation of the building structure based on an external excitation and the controller network for the building structure;
    S2, constructing a target function and a constraint condition of the controller network at the current moment based on the vibration control equation for the building structure;
    S3, transforming the target function and the constraint condition of the controller network at the current moment into a mixed integer optimization problem using a segmented McCormick inequality;
    S4, predicting integer variable values in the mixed integer optimization problem at the current moment using a trained prediction module; and
    S5, obtaining the optimal control force of the controller network at the current moment by solving the mixed integer optimization problem at the current moment based on the predicted integer variable values;
    step 2, calculating, based on the control force of each controller at the current moment and arrangement of a damper of a floor corresponding to the each controller, a control force of the damper at the current moment;
    step 3, adjusting a damping coefficient of the damper according to the control force of the damper at the current moment, and performing a vibration control on the building structure; and
    repeating the step 1 to the step 3 to perform a continuous vibration control on the building structure.

2. A system for vibration control of a building structure, comprising: sensors, dampers, a processing module, and a prediction module; wherein
    the building structure is arranged within the sensors and the dampers, all of the dampers within the building structure constitute a controller network in the building structure, and the processing module is configured to receive state data of the building structure collected by the sensors, obtain a mixed integer optimization problem of the controller network in the building structure after computation and processing based on floor acceleration data collected by the sensors, and feed the mixed integer optimization problem into the prediction module,
    the prediction module is configured to predict an integer variable value in the mixed integer optimization problem and feed the integer variable value back to the processing module,
    the processing module is configured to obtain an optimal control force of the controller network in the building structure at the current moment by calculating based on the integer variable value fed back from the prediction module, and perform a vibration control on the building structure by adjusting a damping coefficient of a corresponding damper based on the optimal control force at the current moment; and
    each of the modules, the sensors, the dampers are programmed or configured to perform the method for vibration control of a building structure of claim 1.

3. The method of claim 1, wherein the constructing a vibration control equation of the building structure based on external excitation and a controller network for the building structure includes:
    S11, constructing a vibration control operational equation of the building structure as follows:

$$M\ddot{\tilde{q}}(t) + C\dot{\tilde{q}}(t) + K\tilde{q}(t) = \tilde{f}(t)B_f + \tilde{w}(t)B_w,$$

wherein M is a mass matrix of the building structure, C is a damping matrix of the building structure, K is a stiffness matrix of the building structure, $B_f$ is a position matrix of one or more controllers in the building structure, $B_w$ is a position matrix of the external excitation in the building structure, and M, C, K, and $B_f$, and the $B_w$ are parameter matrices; a value of each element of the Br represents an existence situation of the controllers on each floor of the building structure, for each element, a value of 1 means that the controller exists on the floor corresponding to the element, and a value of 0 means that the controller does not exist on the floor corresponding to the element; $\tilde{q}(t)$, $\dot{\tilde{q}}(t)$, and $\ddot{\tilde{q}}(t)$ are a displacement vector, a velocity vector, and an acceleration vector of the building structure with respect to ground at a moment t, respectively; $\tilde{f}(t)$ is a control force vector of the controller network at the moment t, and each element of the $\tilde{f}(t)$ indicates a control force vector of the controller in each floor of the building structure at the moment t; $\tilde{w}(t)$ is an external excitation vector at the moment t, and $\tilde{q}(t)$, $\dot{\tilde{q}}(t)$, $\ddot{\tilde{q}}(t)$, $\tilde{f}(t)$, $\tilde{w}(t)$ are column vectors; and S12, after writing the vibration control operational equation of the building structure in a state space form, discretizing the vibration control operational equation using a zero-order keeper to obtain a vibration control state equation of the building structure as follows:

$$\tilde{x}_{s+1} = A\tilde{x}_s + B_f \tilde{f}_s + B_w \tilde{w}_s, \tilde{x}_s = \left[\tilde{q}_s^T, \dot{\tilde{q}}_s^T\right]^T,$$

wherein s denotes a discrete sampling point, $\tilde{x}_{s+1}$ denotes a state vector of the building structure at a (s+1)th discrete sampling point, which indicates a state vector of the building structure at a moment of $(s+1)*\Delta t$; $\tilde{x}_s$ denotes a state vector of the building structure at a sth discrete sampling point, which indicates a state vector of the building structure at a moment of $s*\Delta t$; $\tilde{f}_s$ denotes a control force vector of the building structure at the moment of $s*\Delta t$, $\tilde{w}_s$ denotes an external excitation vector of the building structure at the moment of $s*\Delta t$, $\tilde{x}_{s+1}$ is a state vector of the building structure at a next moment of $\tilde{x}_s$, and there is an interval of $\Delta t$ between $\tilde{x}_{s+1}$ and $\tilde{x}_s$; A denotes a system matrix of the building structure, which is a parameter matrix; $\tilde{q}_s$ is a displacement vector of the building structure with respect to the ground at the moment of $s*\Delta t$; $\dot{\tilde{q}}_s$ is a velocity vector of the building structure with respect to the ground at the moment of $s*\Delta t$; $\tilde{q}_s^T$ is a transpose of the $\tilde{q}_s$ and the $\dot{\tilde{q}}_s^T$ is a transpose of the $\dot{\tilde{q}}_s$, and the $\tilde{q}_s$, the $\dot{\tilde{q}}_s$, the $\tilde{x}_s$ and the $\tilde{x}_{s+1}$ are column vectors, and the state vector is used to represent a velocity and a displacement of floor vibration in the building structure.

4. The method of claim 3, wherein the constructing a target function and a constraint condition of the controller network at a current moment based on the vibration control equation for the building structure further includes: constructing the target function of the controller network in the building structure at the current moment as follows:

$$(X^{BO}, F^{BO}) = \arg\min_{X,F} J(X, F; x_0),$$

the constraint condition is $$\begin{cases} x_{k+1} = Ax_k + B_f f_k \\ (v_k^{rel})^T f_k + f_k^T D f_k \leq 0 \\ f^{min} < f_k < f^{max} \\ x^{min} < x_{k+1} < x^{max} \end{cases},$$

wherein $x_0$ is a state vector of the building structure at the current moment, $x_0 = \tilde{x}_1$; X denotes a state matrix of the building structure at a future moment; F is a control force matrix of the controller network at the current and future moments, $X = [x_1, \ldots, x_k, \ldots, x_{p-1}, x_p]$, $F = [f_0, f_1, \ldots, f_k, \ldots, f_{p-1}]$, wherein $0 \leq k \leq p-1, p \geq 2$, and k and p are positive integers; $x_k$ is a state vector of a next moment of $x_{k-1}$; $f_0$ is a control force vector of the building structure at the current moment, and $f_k$ is a control force vector of the next moment of $f_{k-1}$; and there is an interval of $\Delta t$ time between neighboring moments, and $J(\cdot)$ denotes the target function of the control force of the building structure at the current moment and is a function about X and F, $X^{BO}$ denotes an optimal state matrix of the building structure at the future moment, and $F^{BO}$ denotes an optimal control force matrix of the controller network in the building structure at the current and future moments; $v_k^{rel}$ denotes a relative velocity column vector of the controller network at $\Delta t \cdot k$ from the current moment, and a value of each element of $v_k^{rel}$ denotes a relative velocity column between two ends of each controller in the building structure at $\Delta t \cdot k$ from the current moment; $v_k^{rel}$ is determined based on $x_k$; D is an energy loss diagonal matrix of the controller network, which is a parameter matrix; $f^{min}$, $f^{max}$, $x^{min}$, and $x^{max}$ denote a control force vector when each element of $f_k$ takes a smallest value, a control force vector when each element of $f_k$ takes a largest value, a state vector when each element of $x_k$ takes a smallest value, a state vector when each element of $x_k$ takes a largest value, $<$ is a precedence symbol, which is used to compare elements at a same position in left and right vectors, and $<$ means that a value of the element in the left vector is smaller than a value of the element at the same position in the right vector.

5. The method of claim 4, wherein the transforming the target function and the constraint condition of the controller network at the current moment into a mixed integer optimization problem using a segmented McCormick inequality includes:

S31, introducing a matrix of auxiliary vectors $\Phi$ at the current and future moments, $\Phi = [\Phi_0, \Phi_1, \ldots, \Phi_k, \ldots, \Phi_{p-1}]$, Po is an auxiliary vector of the building structure at the current moment, $\Phi_k$ is an auxiliary vector at a next moment of $\Phi_{k-1}$; $\Phi_k$ denotes an auxiliary vector at a distance of $\Delta t \cdot k$ from the current moment, and an ith element in the auxiliary vector $\varphi_k$ is denoted as $\varphi_{k,i}$; when $\varphi_{k,i} = (D_{i,i} \cdot f_{k,i} + v_{k,i}^{rel}) \cdot f_{k,i}$, $1 \leq i \leq m$, and i is an integer, and $\varphi_{k,i}$ is a scalar, a nonconvex constraint condition $(v_k^{rel})^T f_k + f_k^T D f_k \leq 0$ is transformed into:

$$\begin{cases} \sum_{i=1}^{m} \varphi_{k,i} \leq 0 \\ \varphi_{k,i} = z_{k,i} \cdot f_{k,i} \\ z_{k,i} = D_{i,i} \cdot f_{k,i} + v_{k,i}^{rel} \end{cases},$$

wherein $D_{i,i}$ denotes a value of an element in an ith column of an ith row of an energy loss diagonal matrix D, indicating an energy loss of an ith controller within the building structure; $f_{k,i}$ denotes a value taken by the ith element of the control force vector $f_k$, representing a control force of the ith controller within the building structure, and $v_{k,i}^{rel}$ represents a value taken by the ith element of $v_k^{rel}$, and a relative velocity of ends of the ith controller within the building structure at the distance of $\Delta t \cdot k$ from the current moment, $z_{k,i}$ denotes an intermediate variable of the ith controller within the building structure at the distance of $\Delta t \cdot k$ from the current moment;

the intermediate variable $z_{k,i}$ is used to characterize the energy loss $D_{i,i}$ of the ith controller within the building structure at the distance of $\Delta t \cdot k$ from the current moment, the control force $f_{k,i}$ of the ith controller, and a change relationship between the relative velocity $v_{k,i}^{rel}$ at the ends of the ith controller; the ith element in the auxiliary vector $\Phi_k$ is noted as $\varphi_{k,i}$ and used to characterize a change relationship between the intermediate variable $z_{k,i}$ at the distance of $\Delta t \cdot k$ from the current moment and the control force $f_{k,i}$ of the ith controller;

S32, dividing $f_{k,i} \in [\min(f_{k,i}), \max(f_{k,i})]$ and $z_{k,i} \in [\min(z_{k,i}), \max(z_{k,i})]$ equally into r segments, and using a segmented McCormick inequality to determining $r^2$ feasible domains of a nonconvex constraint $\varphi_{k,i} = z_{k,i} \cdot f_{k,i}$ corresponding to $z_{k,i}$ in a $j_1$st segment and $f_{k,i}$ in a $j_2$nd segment, wherein $j_1 = 1, 2, \ldots, r$, $j_2 = 1, 2, \ldots, r$:

$$\begin{cases} \varphi_{k,i}^{j_1,j_2} \leq \max(z_{k,i}^{j_1}) f_{k,i}^{j_2} + z_{k,i}^{j_1} \min(f_{k,i}^{j_2}) - \max(z_{k,i}^{j_1}) \min(f_{k,i}^{j_2}) \\ \varphi_{k,i}^{j_1,j_2} \leq \min(z_{k,i}^{j_1}) f_{k,i}^{j_2} + z_{k,i}^{j_1} \max(f_{k,i}^{j_2}) - \min(z_{k,i}^{j_1}) \max(f_{k,i}^{j_2}) \\ \varphi_{k,i}^{j_1,j_2} \geq \min(z_{k,i}^{j_1}) f_{k,i}^{j_2} + z_{k,i}^{j_1} \min(f_{k,i}^{j_2}) - \min(z_{k,i}^{j_1}) \min(f_{k,i}^{j_2}) \\ \varphi_{k,i}^{j_1,j_2} \geq \max(z_{k,i}^{j_1}) f_{k,i}^{j_2} + z_{k,i}^{j_1} \max(f_{k,i}^{j_2}) - \max(z_{k,i}^{j_1}) \max(f_{k,i}^{j_2}) \end{cases},$$

wherein $\max(\cdot)$ denotes a maximum function, $\min(\cdot)$ denotes a minimum function, $z_{k,i}^{j_1}$ denotes a value of $z_{k,i}$ on the $j_1$th segment, $f_{k,i}^{j_2}$ denotes a value of $f_{k,i}$ on the j2nd segment, $\varphi_{k,i}^{j_1,j_2}$ denotes a value of $\varphi_{k,i}$ corresponding to the $z_{k,i}$ on the $j_1$th segment and the $f_{k,i}$ on the j2nd segment, $\min(z_{k,i}^{j_1}) \leq \min(z) \leq \max(z_{k,i}^{j_1}) \leq \max(z_{k,i}^{j_1})$, $\min(f_{k,i}) \leq \min(f_{k,i}^{j_2}) \leq \max(f_{k,i}^{j_2}) \leq \max(f_{k,i})$; and S33, after labeling the $r^2$ feasible domains with integer numbers $\xi_{k,i} = \{1, 2, \ldots, r^2\}$, transforming the target function and the constraint condition at the current moment into the mixed integer optimization problem, wherein:

a target function for the mixed integer optimization problem is:

$$(X^{BO}, F^{BO}, \Phi^{BO}, \Xi^{BO}) = \arg\min_{X,F,\Phi,\Xi} J(X, F; x_0),$$

the constraint condition is:

$$\begin{cases} x_{k+1} = A x_k + B_f f_k \\ \sum_{i=1}^{m} \varphi_{k,i} \leq 0 \\ z_{k,i} = D_{i,i} \cdot f_{k,i} + v_{k,i}^{rel} \\ \varphi_{k,i}^{\zeta_{k,i}} \leq \max(z_{k,i}^{\zeta_{k,i}}) f_{k,i}^{\zeta_{k,i}} + z_{k,i}^{\zeta_{k,i}} \min(f_{k,i}^{\zeta_{k,i}}) - \max(z_{k,i}^{\zeta_{k,i}}) \min(f_{k,i}^{\zeta_{k,i}}) \\ \varphi_{k,i}^{\zeta_{k,i}} \leq \min(z_{k,i}^{\zeta_{k,i}}) f_{k,i}^{\zeta_{k,i}} + z_{k,i}^{\zeta_{k,i}} \max(f_{k,i}^{\zeta_{k,i}}) - \min(z_{k,i}^{\zeta_{k,i}}) \max(f_{k,i}^{\zeta_{k,i}}) \\ \varphi_{k,i}^{\zeta_{k,i}} \geq \min(z_{k,i}^{\zeta_{k,i}}) f_{k,i}^{\zeta_{k,i}} + z_{k,i}^{\zeta_{k,i}} \min(f_{k,i}^{\zeta_{k,i}}) - \min(z_{k,i}^{\zeta_{k,i}}) \min(f_{k,i}^{\zeta_{k,i}}), \\ \varphi_{k,i}^{\zeta_{k,i}} \geq \max(z_{k,i}^{\zeta_{k,i}}) f_{k,i}^{\zeta_{k,i}} + z_{k,i}^{\zeta_{k,i}} \max(f_{k,i}^{\zeta_{k,i}}) - \max(z_{k,i}^{\zeta_{k,i}}) \max(f_{k,i}^{\zeta_{k,i}}) \\ \zeta_{k,i} = \{1, 2, \ldots, r^2\} \\ (v_k^{rel})^T f_k + f_k^T D f_k \leq 0 \\ f^{min} < f_k < f^{max} \\ x^{min} < x_{k+1} < x^{max} \end{cases}$$

wherein $\Xi^{BO}$ denotes an optimal auxiliary vector matrix of the building structure at the current and future moments; $\Xi$ denotes a set of integer numbers corresponding to a feasible domain of the constraint condition when the building structure is at the current and future moments, $$\Xi = \{\zeta_0, \zeta_1, \ldots, \zeta_k, \ldots, \zeta_{p-1}\},$$

$\xi_0$ denotes a set of integer numbers corresponding to the feasible domain of the constraint condition when the building structure is at the current moment, $\xi_k$ denotes a set of integer numbers corresponding to the feasible domain of the constraint condition when the building structure is at the distance of $\Delta t \cdot k$ from the current moment, $\xi_k$ is a set of integer numbers corresponding to the feasible domain of the constraint condition when the building structure is at a next moment of $\xi_{k-1}$, and $\Xi^{BO}$ denotes a set of integer numbers corresponding to optimal feasible domains of the building structure at the current and future moments, which means that an optimal control force matrix $F^{BO}$ of the building structure at the current and future moments is calculated based on the integer numbers corresponding to the optimal feasible domains in $\Xi^{BO}$; $\xi_{k,i}$ denotes an integer number of the feasible domain of the constraint condition when the ith controller of the building structure is at the distance of $\Delta t \cdot k$ from the current moment.

6. The method of claim 5, wherein in the S32, r is an integer not less than 4.

7. The method of claim 5, wherein the predicting integer variable values in the mixed integer optimization problem at the current moment using a trained prediction module includes:

S41, constructing a training set;

S42, the prediction module being provided with h parallel DNN subneural networks, predicting the integer numbers of the optimal feasible domains by training the prediction module using the training set; and S43, predicting the integer variable values $\Xi^{BO}$ in the mixed integer optimization problem at the current moment using the trained prediction module.

8. The method of claim 7, wherein in the S42, h=3.

9. The method of claim 7, wherein the constructing a training set includes:

S411, generating an external excitation time-range with a spectrum characteristic being consistent with a specification, acting the external excitation time-range with a spectrum characteristic on the building structure, and obtaining a real-time state vector of the building structure based on sensors in the building structure;

S412, determining, using a first solver, a set of optimal integer numbers of the feasible domain of the constraint condition when the building structure is in a corresponding future moment based on state vectors of the building structure at different moments, noting the state vector of the building structure at any moment as $x_0^{(N)}$ then noting a set of optimal integer numbers of the feasible domain of the constraint condition in a future moment corresponding to $x_0^{(N)}$ as $\Xi^{(N)} = \{\xi_0^{(N)}, \xi_1^{(N)}, \ldots, \xi_k^{(N)}, \ldots, \xi_{p-1}^{(N)}\}$, wherein N is an integer greater than 1, $x_0^{(N)}$ is a Nth input in the training set, $\Xi^{(N)}$ is a Nth output in the training set, the training set formed by an input and an output of the training set together, and a data pair $\{x_0^{(N)}, \Xi^{(N)}\}$ is a Nth pair of samples in the training set; and S413, calculating an increasing count of samples in the training set using a Good-Turing smoothing manner until a calculation result of the Good-Turing smoothing manner exceeds a first threshold, and the training set being no longer adding new samples.

10. The method of claim 7, wherein the obtaining an optimal control force of the controller network at the current moment by solving the mixed integer optimization problem at the current moment based on the predicted integer variable values includes: after solving a current mixed integer optimization problem using a second solver based on the $\Xi^{BO}$ predicted by the prediction module, obtaining an optimal control force matrix $F^{BO}$ of the controller network at the current and future moments, and designating a column vector $f_0^{BO}$ in the optimal control force matrix $F^{BO}$ as the optimal control force of the controller network at the current moment.

11. The method of claim 7, wherein, the obtaining an optimal control force of the controller network at the current moment by solving the mixed integer optimization problem at the current moment based on the predicted integer variable values includes:

after solving a current mixed integer optimization problem using a third solver based on the $\Xi^{BO}$ predicted by the prediction module, obtaining the optimal control force matrix $F^{BO}$, the optimal state matrix $X^{BO}$, and a corresponding target function values $J(X^{BO}, F^{BO}; x_0)$ of the controller network in the building structure at the current and future moments; and determining, using a standby solver, a standby control matrix $F^{backup}$, a standby state matrix $X^{backup}$, and a corresponding target function standby value $J^{backup}$ at the current and future moments based on a semi-active control manner, and if $J(X^{BO}, F^{BO}; x_0) < J^{backup}$, designating a first column vector $f_0^{BO}$ in the optimal control force matrix $F^{BO}$ as the optimal control force of the controller network in the building structure at the current moment; if $J(X^{BO}, F^{BO}; x_0) \geq J^{backup}$, designating a column vector $f_0^{backup}$ of a standby control force in the standby control matrix $F^{backup}$ as the optimal control force of the controller network in the building structure.

\* \* \* \* \*